United States Patent
Kurumizawa et al.

(10) Patent No.: US 9,461,407 B2
(45) Date of Patent: Oct. 4, 2016

(54) MANUAL UNLOCKING STRUCTURE FOR POWER FEEDING PLUG LOCKING DEVICE

(75) Inventors: Naoto Kurumizawa, Aichi (JP); Shinji Ichikawa, Toyota (JP); Nobuhiro Kibudera, Toyota (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 801 days.

(21) Appl. No.: 13/643,132

(22) PCT Filed: Feb. 25, 2011

(86) PCT No.: PCT/JP2011/054999
§ 371 (c)(1),
(2), (4) Date: Oct. 24, 2012

(87) PCT Pub. No.: WO2011/142164
PCT Pub. Date: Nov. 17, 2011

(65) Prior Publication Data
US 2013/0040486 A1 Feb. 14, 2013

(30) Foreign Application Priority Data
May 12, 2010 (JP) .................. 2010-110662

(51) Int. Cl.
*H01R 13/639* (2006.01)
*B60L 11/18* (2006.01)
(Continued)

(52) U.S. Cl.
CPC ......... *H01R 13/639* (2013.01); *B60L 11/1818* (2013.01); *B60L 2270/32* (2013.01); *B60L 2270/34* (2013.01); *H01R 13/6272* (2013.01); *H01R 13/633* (2013.01);
(Continued)

(58) Field of Classification Search
CPC ........... Y10T 403/591; Y10T 403/593; Y10T 403/598; Y10T 403/599; Y10T 403/581; Y10T 403/583; Y10T 403/585; Y10T 403/587; H01R 13/6272; H01R 13/6275; H01R 13/62933; H01R 2201/26; B60L 11/1818
See application file for complete search history.

(56) References Cited

U.S. PATENT DOCUMENTS 5,344,331 A * 9/1994 Hoffman ............. B60L 11/1818
439/138
5,456,135 A * 10/1995 Li .......................... B62K 21/16
403/103

(Continued)

FOREIGN PATENT DOCUMENTS

DE 3504466 3/1986
DE 102008024584 11/2009

(Continued)

*Primary Examiner* — Jonathan Masinick
(74) *Attorney, Agent, or Firm* — Greenblum & Bernstein, P.L.C.

(57) ABSTRACT

A manual unlocking structure arranged in a locking device for locking a power feeding plug to a power receiving connector arranged in a vehicle. The power feeding plug includes a hook. The locking device includes a fastening member capable of fastening the hook to the power receiving connector to lock the power feeding plug to the power receiving connector. The manual unlocking structure includes an operation member that is manually operable to move and separate the fastening member from the hook. A user operates the operation member to manually unlock the power feeding plug. An operation box is arranged in the vehicle and used to manually operate the operation member in the vehicle.

6 Claims, 15 Drawing Sheets

(51) Int. Cl.
*H01R 13/627* (2006.01)
*H01R 13/633* (2006.01)

(52) U.S. Cl.
CPC ........ *Y02T 10/7005* (2013.01); *Y02T 10/7072* (2013.01); *Y02T 90/14* (2013.01)

(56) References Cited

U.S. PATENT DOCUMENTS

| | | | |
|---|---|---|---|
| 7,419,390 B2* | 9/2008 | Ohtaka | H01R 13/639 439/157 |
| 2004/0184874 A1* | 9/2004 | Walsh | E05B 47/0603 403/322.3 |
| 2005/0117965 A1* | 6/2005 | Huang | F16B 7/0406 403/322.1 |
| 2009/0082916 A1 | 3/2009 | Tanaka | |
| 2009/0290931 A1* | 11/2009 | Blanchard | A01D 34/82 403/204 |

FOREIGN PATENT DOCUMENTS

| | | |
|---|---|---|
| JP | 09-161884 | 6/1997 |
| JP | 09-161898 | 6/1997 |
| JP | 2009-073217 | 4/2009 |
| JP | 2011-138644 | 7/2011 |
| WO | 94/18723 | 8/1994 |

* cited by examiner

MANUAL UNLOCKING STRUCTURE FOR POWER FEEDING PLUG LOCKING DEVICE

TECHNICAL FIELD

The present invention relates to a manual unlocking structure for a locking device that locks a power feeding plug, which delivers power when charging a battery, to a power receiving connector and is arranged in the power receiving connector.

BACKGROUND ART

Automobile manufacturers are developing electric vehicles (including hybrid vehicles) to reduce exhaust emissions from vehicles. Such a vehicle uses a motor as a drive source. The motor is powered by a battery. Whenever the state of charge of the battery becomes low, the user of the electric vehicle must charge the battery with a charger that is installed in a household or a charging station. Japanese Laid-Open Patent Publication No. 9-161898 describes a charging system for an electric vehicle that is easy to use. This charging system includes an inlet, or power receiving connector, which is arranged in the vehicle and connected to a power feeding connector (power feeding plug). The power feeding plug is connected to a household outlet for a commercial power supply. When the user is at home, the user connects the power feeding plug to the inlet of the parked vehicle to charge the vehicle battery with commercial power.

To prevent separation of the power feeding plug from the inlet, a locking device is used to hold the power feeding plug on the inlet. One example of such a locking device includes a hook, which is arranged on the power feeding plug, and a catch, which is arranged on the inlet. The hook engages the catch to lock the power feeding plug to the inlet. This prevents separation of the power feeding plug from the inlet. To disconnect the power feeding plug from the inlet, the hook is separated and disengaged from the catch. This unlocks the power feeding plug from the inlet.

Although fast charging technology is being developed for electric vehicles, the time required to charge the battery of an electric vehicle is still much longer than that required to refuel a gasoline engine vehicle. Further, quick chargers are still rarely installed in normal households. Thus, when a user charges the battery of an electric vehicle at home without using a quick charger, the user plugs the power feeding connector to a household outlet. In this case, the vehicle would be left unattended over a long period of time. However, someone may disconnect the power feeding plug from the vehicle and connect the power feeding plug to another vehicle to steal electricity. Otherwise, the power feeding plug itself may be stolen.

A locking device has thus been developed to prohibit unauthorized disconnection of the power feeding plug from the inlet. One example of such a locking device includes a lock bar, which is driven by a motor. In a state in which the hook of the power feeding plug is engaged with the catch of the inlet, the lock bar fastens the hook at a lock position and restricts movement of the hook. When the lock bar is in such a locked state, the power feeding plug cannot be disconnected from the inlet. To disconnect the power feeding plug from the inlet, the lock bar is moved to an unlock position to permit movement of the hook.

DISCLOSURE OF THE INVENTION

In a locking device that just engages the hook with the catch, for example, when the hook bends, this may hinder disengagement of the hook from the catch such that the power feeding plug cannot be disconnected from the inlet. In a locking bar that fastens the hook with a lock bar to prevent unauthorized disconnection of the power feeding plug, when an abnormality occurs in the motor or controller, the lock bar cannot be moved from the lock position. In such a case, the hook cannot be moved. That is, the power feeding plug remains locked, and the power feeding plug cannot be disconnected from the inlet.

In such cases, the power feeding plug remains connected to the vehicle. Thus, the vehicle cannot be moved, and a serviceman must be fetched to cope with the problem. In this manner, a measure for coping with such a problem, in which an abnormality occurs in the motor, controller, or the like and the lock bar cannot be driven from the lock position, is required.

The present invention provides a manual unlocking structure that manually unlocks a power feeding plug even when an abnormality occurs in a locking device when the locking device is locking the power feeding plug to a power receiving connector. The present invention also provides a locking device including such a manual unlocking structure.

One aspect of the present invention is a manual unlocking structure arranged in a locking device for locking a power feeding plug to a power receiving connector. The power feeding plug includes a hook, and the locking device includes a fastening member capable of fastening the hook to the power receiving connector to lock the power feeding plug to the power receiving connector. The manual unlocking structure includes an operation member that is manually operable to cause the fastening member to move and separate from the hook to cancel a locked state of the power feeding plug.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENTS

First Embodiment

A manual unlocking structure for a power feeding plug locking device according to a first embodiment of the present invention applied to a power receiving connector of a plug-in hybrid vehicle will now be discussed with reference to FIGS. 1 to 10.

Figure 1:
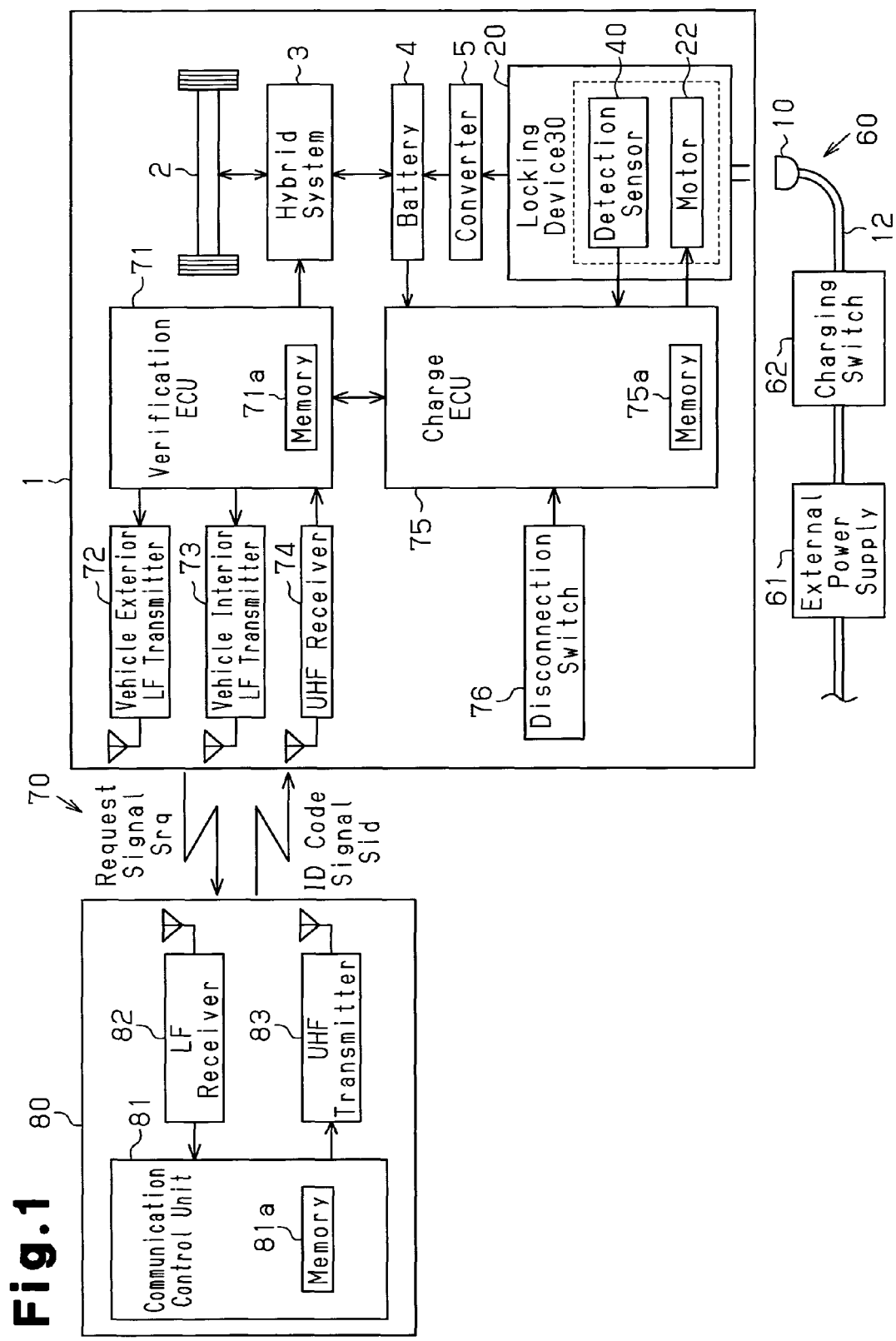
FIG. 1 is a schematic block diagram of an electronic key system and a charging system.

Referring to FIG. 1, a plug-in hybrid vehicle 1 includes drive wheels 2 and a hybrid system 3, which uses an engine and a motor in combination to drive the drive wheels 2. The hybrid system 3 operates in a mode using only the engine to drive the drive wheels 2, a mode using the motor to drive the drive wheels 2 while generating electric power with the engine, a mode using both the engine and the motor to drive the drive wheels 2, and a mode using only the motor to drive the drive wheels 2. One of these modes is selected to drive the vehicle 1.

The hybrid system 3 is connected to a battery 4, which supplies the motor with power. In addition to being charged by the power generated by the engine, the battery 4 is chargeable by an external power supply 61 of the vehicle 1 using, for example, nighttime power supplied from a household outlet. The plug-in hybrid vehicle 1 is capable of traveling with just the motor over a longer distance than a conventional hybrid vehicle. This reduces the frequency of engine operation.

An electronic key system 70 is installed in the vehicle 1 so that vehicle operations such as the locking and unlocking of the doors can be performed without the driver actually operating a vehicle key. The electronic key system 70 uses an electronic key 80 as a vehicle key. The electronic key 80 is capable of transmitting a unique ID code through wireless communication. In the electronic key system 70, the vehicle 1 transmits an ID code response request signal Srq. In response to the request signal Srq, the electronic key 80 sends back an ID code signal Sid, which includes its ID code, to the vehicle 1 through narrowband wireless communication. When the ID code of the electronic key 80 conforms to an ID code of the vehicle 1, the electronic key system 70 permits or performs the locking and unlocking of the doors. The electronic key system 70 is one example of a wireless authentication system.

The electronic key system 70 will now be described in detail. The vehicle 1 includes a verification electronic control unit (ECU) 71, which serves as a verification device. The verification ECU 71 performs ID verification with the electronic key 80 through narrowband wireless communication. The verification ECU 71 is connected to a vehicle exterior low frequency (LF) transmitter 72, a vehicle interior LF transmitter 73, and an ultrahigh frequency (UHF) receiver 74. The LF transmitter 72 is arranged in each door of the vehicle 1 and transmits wireless signals out of the vehicle 1 in the LF band. The LF transmitter 73 is arranged in the vehicle under the floor or the like and transmits wireless signals to the interior of the vehicle 1 in the LF band. The UHF receiver 74 is arranged in the rear of the vehicle body or the like to receive wireless signals in the UHF band. The verification ECU 71 includes a memory 71a, which stores an ID code as a unique key code.

The electronic key 80 includes a communication control unit 81, which functions to perform wireless communication with the vehicle 1 in compliance with the electronic key system 70. The communication control unit 81 includes a memory 81a, which stores an ID code as a unique key code. The communication control unit 81 is connected to an LF receiver 82, which receives signals in the LF band, and a UHF transmitter 83, which transmits signals in the UHF band in accordance with commands from the communication control unit 81.

The verification ECU 71 intermittently transmits a request signal Srq in the LF band from the vehicle exterior LF transmitter 72 and forms a vehicle exterior communication area near the vehicle 1. When the electronic key 80 enters the vehicle exterior communication area and receives the request signal Srq with the LF receiver 82, the electronic key 80 sends back an ID code signal Sid including the ID code in the UHF band from the UHF transmitter 83 in response to the request signal Srq. When receiving the ID code signal Sid with the UHF receiver 74, the verification ECU 71 compares the ID code registered in its memory 71a with the ID code of the electronic key 80 to perform ID verification (vehicle exterior verification) on the electronic key 80. When vehicle exterior verification is successful, the verification ECU 71 permits or performs locking and unlocking of the doors with a door lock (not shown).

When recognizing that the doors have been unlocked upon successful vehicle exterior verification and that the driver has opened a door and entered the vehicle 1, the verification ECU 71 transmits a request signal Srq from the vehicle interior LF transmitter 73 to form a vehicle interior communication area throughout the vehicle interior. The electronic key 80 enters the vehicle interior communication area and returns an ID code signal Sid in response to the request signal Srq. When the UHF receiver 74 receives the ID code signal Sid, the verification ECU 71 verifies the ID code of the electronic key 80 with the ID code registered in the memory 71a to perform ID verification (vehicle interior verification) on the electronic key 80. When vehicle interior verification is successful, the verification ECU 71 permits the starting of the hybrid system.

A battery charging system 60 for the plug-in hybrid vehicle that charges the battery 4 will now be discussed. The charging system 60 includes a power feeding plug 10 used to charge the battery 4. The power feeding plug 10 is arranged in, for example, a household or a charging station. The power feeding plug 10 is connected by a cable 12 to an external power supply 61 (commercial power supply), which supplies 200 V of AC power, for example. The cable 12 includes a charging switch 62, which is operated to start charging.

The plug-in hybrid vehicle 1 includes an inlet 20, which serves as a power receiving connector connectable to the power feeding plug 10. The inlet 20 includes a receptacle, which receives the power feeding plug 10, and is installed, for example, in a front wall of the vehicle body in the same manner as a fuel tank opening of a gasoline vehicle. A converter 5 converts the AC power supplied from the power feeding plug 10 via the inlet 20 to DC voltage and charges the battery 4 with the DC voltage. When the ID code of the electronic key 80 carried by the user is authenticated, insertion of the power feeding plug 10 into the inlet 20 is permitted. Vehicle key authentication is performed by verifying the ID code of the electronic key 80. The vehicle exterior communication area is formed around the entire vehicle 1. Further, the vehicle 1 constantly generates a key inquiry (transmits a request signal Srq) to perform polling. Thus, ID verification is performed as long as the user is carrying the vehicle key. The user does not have to manually operate the electronic key.

In the first embodiment, the charging system 60 permits charging under the condition that the electronic key system 70 has performed successful ID verification and the power feeding plug 10 has been connected to the inlet 20. The vehicle 1 includes a charge ECU 75, which serves as a controller for executing charging-related control. The charge ECU 75 communicates with the verification ECU 71 through an in-vehicle local area network (LAN) and is capable of checking the verification ECU 71 for ID verification results.

The inlet 20 includes a locking device 30. The locking device 30 includes a detection sensor 40, which serves as a detector, and a motor 22. The detection sensor 40 and the motor 22 are connected to the charge ECU 75. The detection sensor 40 monitors whether or not a hook 16, which is arranged in the power feeding plug 10, is engaged with a catch 21, which is arranged in the inlet 20. When the detection sensor 40 detects engagement of the hook 16 and the catch 21, the detection sensor 40 provides a detection signal to the charge ECU 75. When the charge ECU 75 recognizes that ID verification has been successful and that the hook 16 and catch 21 are engaged with each other, the charge ECU 75 controls the locking device 30 to switch the state of the hook 16 engaged with the catch 21 between a locked state and an unlocked state. In the first embodiment, the locked state refers to a state in which movement of the hook 16 is restricted. In the locked state, the hook 16 cannot be disengaged from the catch 21. Thus, disconnection of the power feeding plug 10 from the inlet 20 (power receiving connector) is prohibited. Accordingly, when the hook 16 is held in the locked state, the power feeding plug 10 is kept locked to the inlet 20. The unlocked state refers to a state in which the movement of the hook 16 is permitted. In the unlocked state, the hook 16 is operated and separated from the catch 21 so that the hook 16 and catch 21 are disengaged from each other. Accordingly, when the hook 16 is switched to the unlocked state, disconnection of the power feeding plug 10 from the inlet 20 is permitted.

The vehicle 1 includes a disconnection switch 76, which is operated when disconnecting the power feeding plug 10. The disconnection switch 76 provides an operation signal to the charge ECU 75. The charging system 60 permits disconnection of the power feeding plug 10 from the inlet 20 under the condition that the electronic key system 70 has performed successful ID verification and that the disconnection switch 76 has been operated. In this case, the charge ECU 75 uses the locking device 30 to switch the state of the hook 16 engaged with the catch 21 from the locked state to the unlocked state to permit disconnection of the power feeding plug 10. The verification ECU 71 permits starting of the hybrid system 3 under the condition that in-vehicle verification has been successful.

Figure 2:
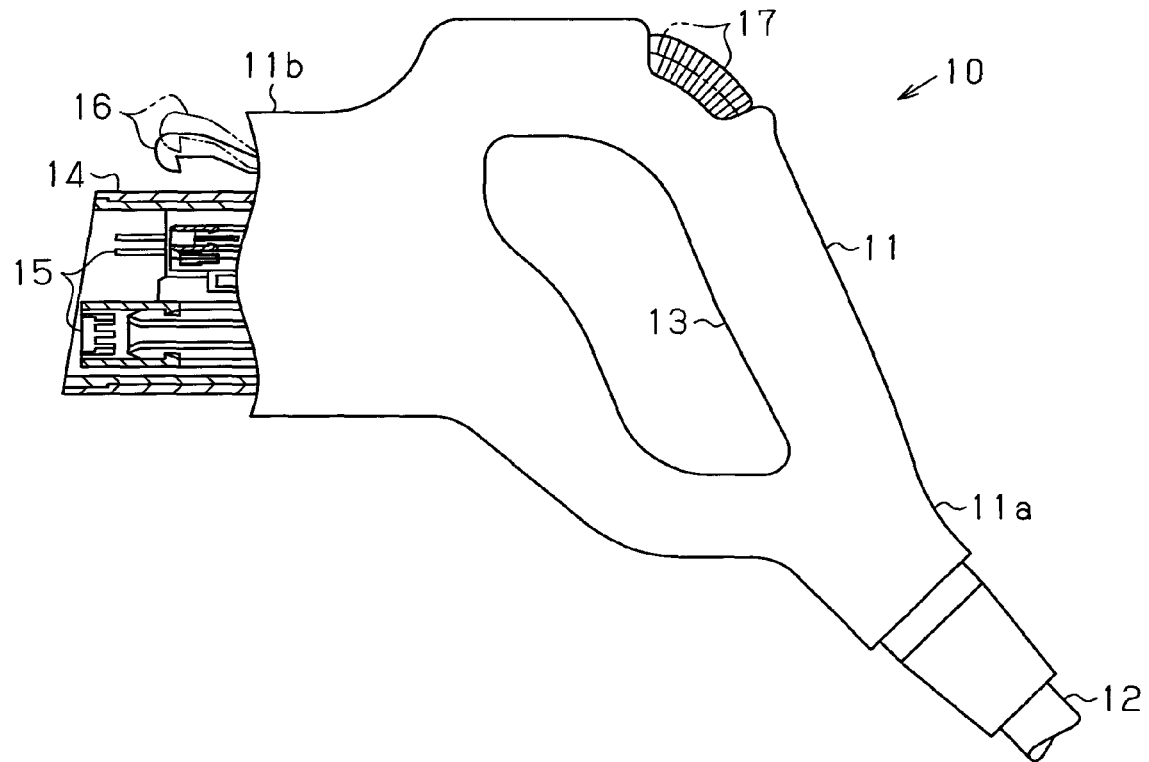
FIG. 2 is a schematic cross-sectional view of a power feeding plug.

Referring to FIG. 2, the power feeding plug 10 includes a main body 11, which includes a basal end 11a, a distal end 11b, and a grip 13. The basal end 11a is connected to the cable 12. The grip 13 is gripped by the user. The distal end 11b includes a cylindrical coupler 14, which can be inserted into the inlet 20. In the illustrated example, a plurality of connection terminals 15 are arranged in the coupler 14 to electrically connect the power feeding plug 10 to the inlet 20. The connection terminals 15 include a power terminal, through which power is transmitted, and control terminals, through which various types of control commands are communicated.

The hook 16 of the power feeding plug 10 is arranged above the coupler 14 to hold the power feeding plug 10 (coupler 14) in the inlet 20. The hook 16 is tiltable between a close position and an open position. In the close position, the hook 16 is engaged with the inlet (as indicated by the solid lines in FIG. 2) and holds the coupler 14 of the power feeding plug 10 in the inlet 20. In the open position, the hook 16 is separated from the inlet 20 and tilted (as indicated by double-dashed lines in FIG. 2). The hook 16 is normally held at the close position. The hook 16 moves to the open position when an operation unit 17, which is arranged at an upper side of the grip 13, is pushed.

Figure 3:
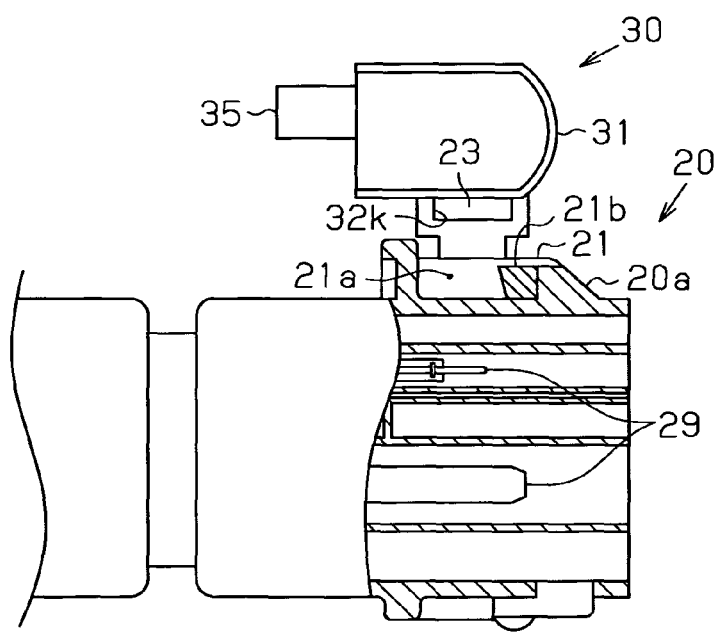
FIG. 3 is a schematic cross-sectional view of a locking device arranged in an inlet.

As shown in FIG. 3, the inlet 20 includes a plurality of connection terminals 29, which are connected to the connection terminals 15 of the power feeding plug 10. The plurality of connection terminals 29 include a power terminal and control terminals, which are electrically connected to the power terminal and control terminals of the power feeding plug 10, respectively. The inlet 20 includes an outer surface 20a. The catch 21, which engages the hook 16 of the power feeding plug 10, is formed on part (upper part as viewed in FIG. 3) of the outer surface 20a. When the hook 16 of the power feeding plug 10 is engaged with the catch 21 of the inlet 20, the power feeding plug 10 is held in the inlet 20. The catch 21 includes a cavity 21a, into which the hook 16 is inserted. A projection 21b, which engages with the hook 16, is arranged in the cavity 21a.

As shown in FIGS. 4 to 10, the locking device 30 is arranged on the upper part of the inlet 20. As described above, the locking device 30 switches the state of the hook 16 engaged with the catch 21 between the locked state and the unlocked state. The locking device 30 includes the motor 22, which serves as a drive unit, a transmission shaft 25 (geared shaft), which serves as a transmission member, a stopper 26, and a lock bar 23. The motor 22 produces drive force that rotates the transmission shaft 25. The rotational movement of the transmission shaft 25 is converted into linear movement of the stopper 26. The movement of the stopper 26 moves the lock bar 23 to a lock position and an unlock position. The lock bar 23 is located above the hook 16 at the lock position and separated from above the hook 16 at the unlock position. When the lock bar 23 is located at the lock position, the hook 16 is held in the locked state. Thus, in the locked state, the hook 16 cannot be tilted to the open position. In the first embodiment, the lock bar 23 functions as a restriction member capable of restricting movement of the hook. In broader terms, the lock bar 23 functions as a fastening member capable of fastening the hook 16 to the inlet 20.

Figure 4:
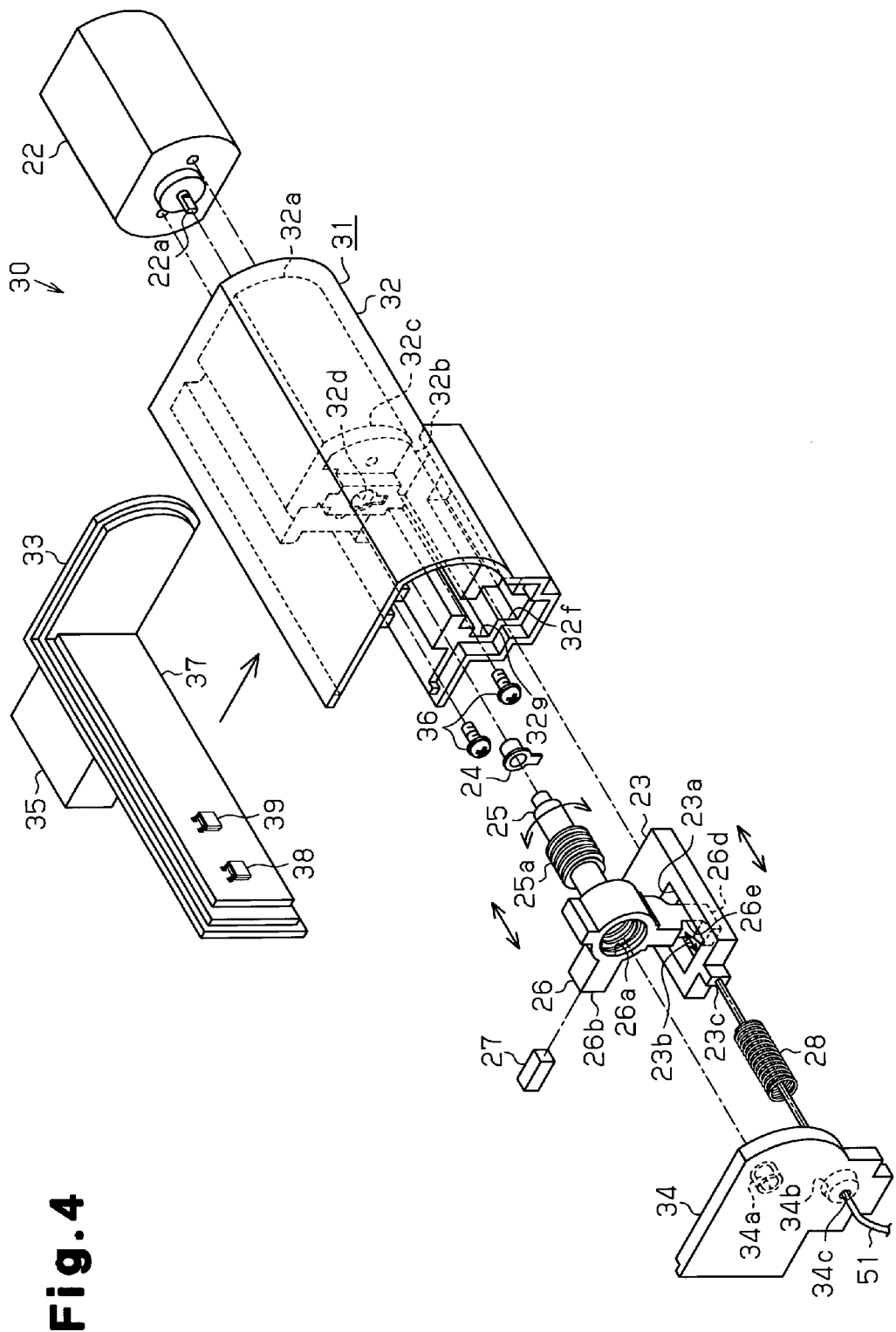
FIG. 4 is an exploded perspective view of the locking device shown in FIG. 3.

As shown in FIG. 4, the locking device 30 includes a main body case 31, which serves as a shell. The main body case 31 includes a main body 32 and first and second lids 33 and 34. The main body 32 accommodates locking mechanism components such as the lock bar 23 and the motor 22. The first and second lids 33 and 34 are coupled to the main body 32. The main body 32 is generally box-shaped and includes two opposite open ends and one open side. The first lid 33 closes the open side and one of the two open ends. The second lid 34 closes the other one of the open ends. The main body case 31 includes an external connector 35, which is electrically connected to an external device (not shown).

The main body 32 includes a motor accommodation compartment 32a, which accommodates the motor 22, a component accommodation compartment 32b, which accommodates other components such as the lock bar 23, and a partition wall 32c, which partitions the motor and component accommodation compartments 32a and 32b. Two screws 36 fasten the motor 22 to the motor accommodation compartment 32a. The motor 22 includes a drive shaft 22a, which is inserted into an insertion bore 32d extending through the partition wall 32c and projected into the component accommodation compartment 32b. The transmission shaft 25 is fixed to and rotated integrally with the drive shaft 22a of the motor 22. The transmission shaft 25 is cylindrical and has one end supported by a sleeve 24 in the insertion bore 32d and another end supported by a bearing 34a in the second lid 34. A male threaded portion 25a is formed between the two ends of the transmission shaft 25.

The transmission shaft 25 is mated with the stopper 26. More specifically, the stopper 26 includes a bore extending in the axial direction of the transmission shaft 25. An inner wall of the stopper 26 includes a female threaded portion 26a, which is mated with the male threaded portion 25a of the transmission shaft 25. In this manner, the transmission shaft 25 is integrally coupled to the stopper 26. The male threaded portion 25a of the transmission shaft 25 and the female threaded portion 26a of the stopper 26 function as a movement conversion mechanism. When the motor 22 rotates the transmission shaft 25, the male threaded portion 25a of the transmission shaft 25 is rotated relative to the female threaded portion 26a of the stopper 26, and the stopper 26 linearly moves in the axial direction of the transmission shaft 25. The stopper 26 contacts and moves the lock bar 23. The stopper 26 is movable in a reciprocating manner between a lock position (restriction position), in which the lock bar 23 restricts movement of the hook 16, and an unlock position (non-restriction position), in which the lock bar 23 does not restrict movement of the hook 16.

The stopper 26 includes a magnet retainer 26b, which retains a magnet 27 used to detect the position of the stopper 26. The magnet retainer 26b projects in a horizontal direction that is orthogonal to the movement direction of the stopper 26. A substrate 37 is secured to an inner surface of the second lid 34. A first hall element 38 and a second hall element 39 are arranged on the substrate 37 at positions facing toward the magnet 27. The first hall element 38 is arranged in correspondence with the unlock position of the stopper 26 (lock bar 23). The second hall element 39 is arranged in correspondence with the lock position of the stopper 26 (lock bar 23).

The stopper 26 includes a lower rail 26d, which guides the linear reciprocation of the stopper 26. The lower rail 26d is fitted to a lower guide groove 32f, which is formed in an inner lower part of the main body 32.

Figure 5:
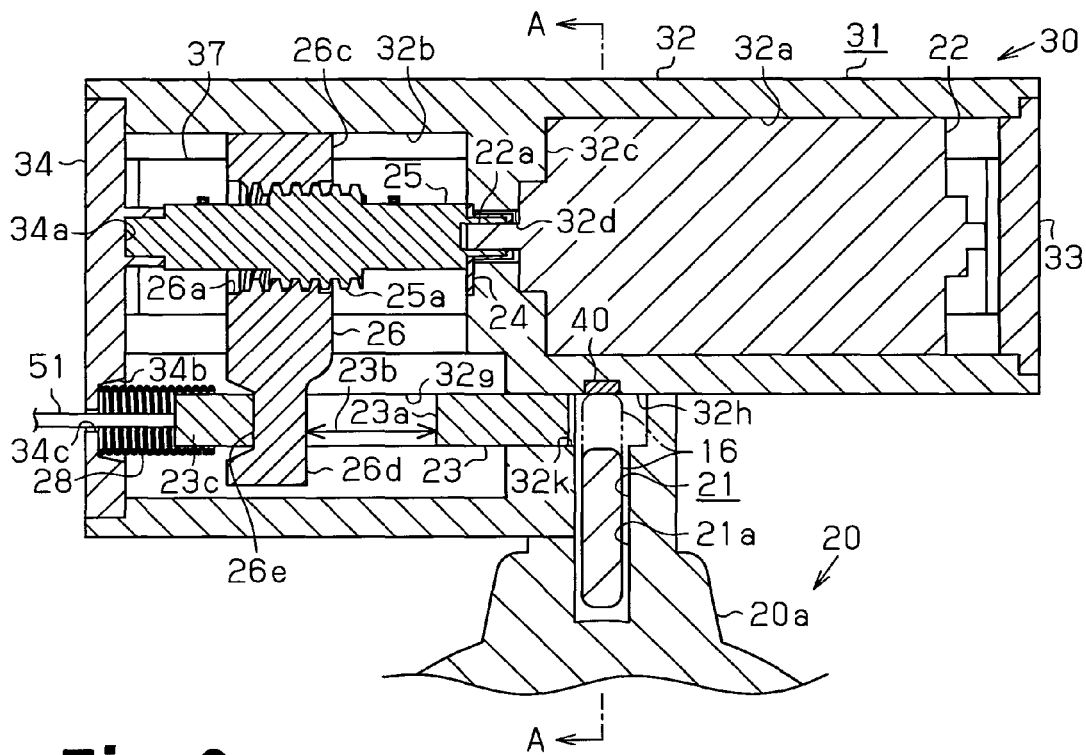
FIG. 5 is a cross-sectional view of the locking device shown in FIG. 4 and illustrates engagement of a hook in the power feeding plug.

As shown in FIG. 5, the lock bar 23, which restricts movement of the hook 16, is plate-shaped. A buffer opening 23a, which serves as a recess, extends through a central part of the lock bar 23. The lower rail 26d of the stopper 26 is loosely inserted into the buffer opening 23a. Thus, a clearance 23b is formed in the axial direction of the transmission shaft 25 between a wall of the buffer opening 23a and the lower rail 26d of the stopper 26 inserted into the buffer opening 23a. The lower rail 26d includes a recess 26e, which abuts a wall of the buffer opening 23a and positions the lock bar 23. In a state in which the lower rail 26d of the stopper 26 abuts the wall of the buffer opening 23a, the stopper 26 is moved from the lock position to the unlock position. This moves the lock bar 23 from the lock position to the unlock position. The lock bar 23 is fitted to a lock bar guide groove 32g, which is formed in the main body 32, and linearly moved along the lock bar guide groove 32g.

The lower part of the main body 32 includes a projection bore 32k. The lock bar 23 projects out of the component accommodation compartment 32b through the projection bore 32k to move to the lock position. The main body 32 also includes a support wall 32h that supports and holds the lock bar 23 from above. The support wall 32h is defined by a lower surface of the main body 32, for example, a lower surface of the motor accommodation compartment 32a. When someone attempts to forcibly disconnect the power feeding plug 10 from the inlet 20, the support wall 32h restricts upward movement of the lock bar 23 and prevents the hook 16 from being lifted. In this manner, the support wall 32h supports and holds the lock bar 23 from above to prevent unauthorized disconnection of the power feeding plug 10.

A spring 28, which serves as an urging member that urges the lock bar 23 to the lock position, is arranged between the lock bar 23 and the second lid 34. The lock bar 23 has a surface facing toward second lid 34 that includes a spring support 23c, which supports the spring 28. The spring 28 has two ends respectively fixed to the spring support 23c and a spring seat 34b (recess), which is formed in the inner wall of the second lid 34. The spring 28 urges the lock bar 23 away from the second lid 34 in the axial direction of the motor 22. That is, the urging force of the spring 28 urges the lock bar 23 toward the lock position. When the stopper 26 linearly moves from the lock position to the unlock position, the lower rail 26d pushes the wall of the buffer opening 23a and moves the lock bar 23 to the unlock position. Further, when the stopper 26 moves linearly from the unlock position to the lock position, the urging force of the spring 28 pushes and moves the lock bar 23 to the lock position.

Figure 9:
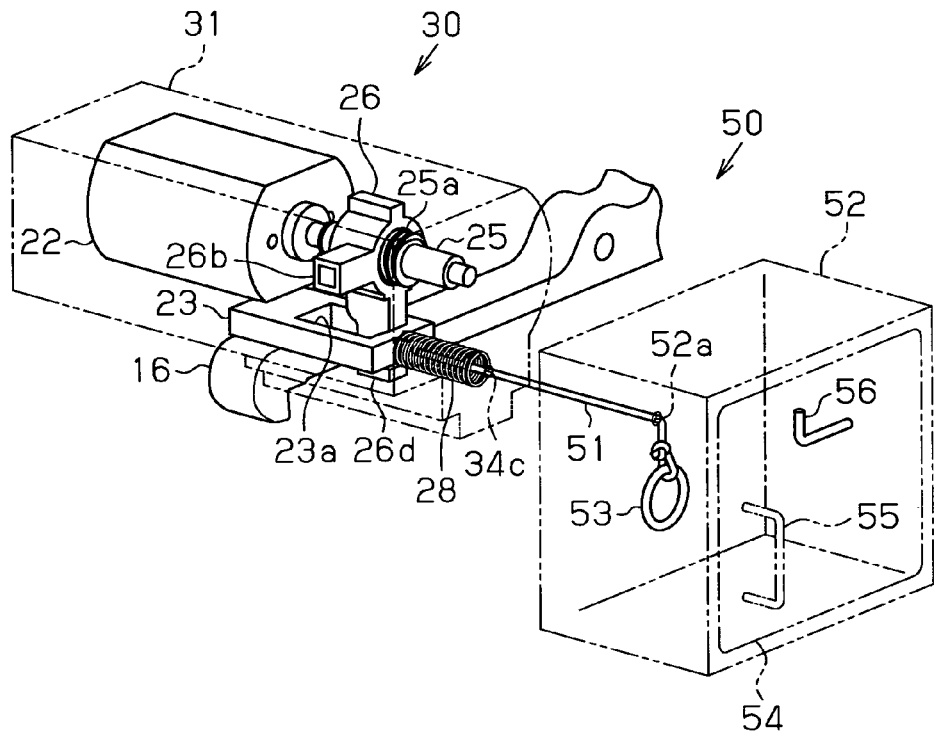
FIG. 9 is a perspective view of a manual unlocking mechanism arranged in the locking device shown in FIG. 4.
Figure 10:
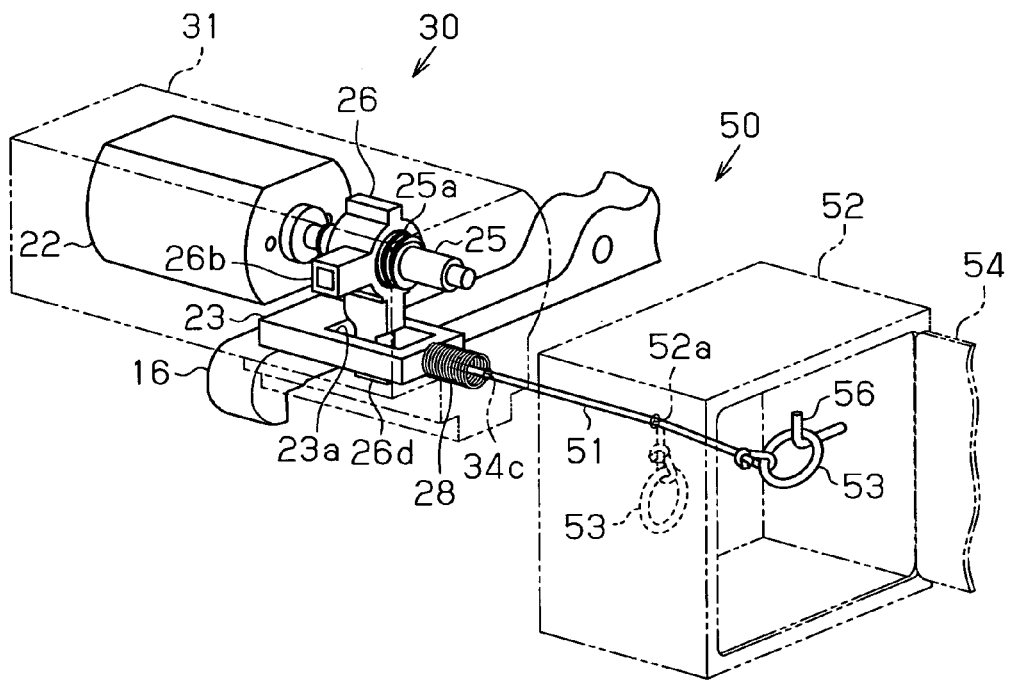
FIG. 10 is a perspective view of the manual unlocking mechanism shown in FIG. 9 in a manually unlocked state.
Figure 11:
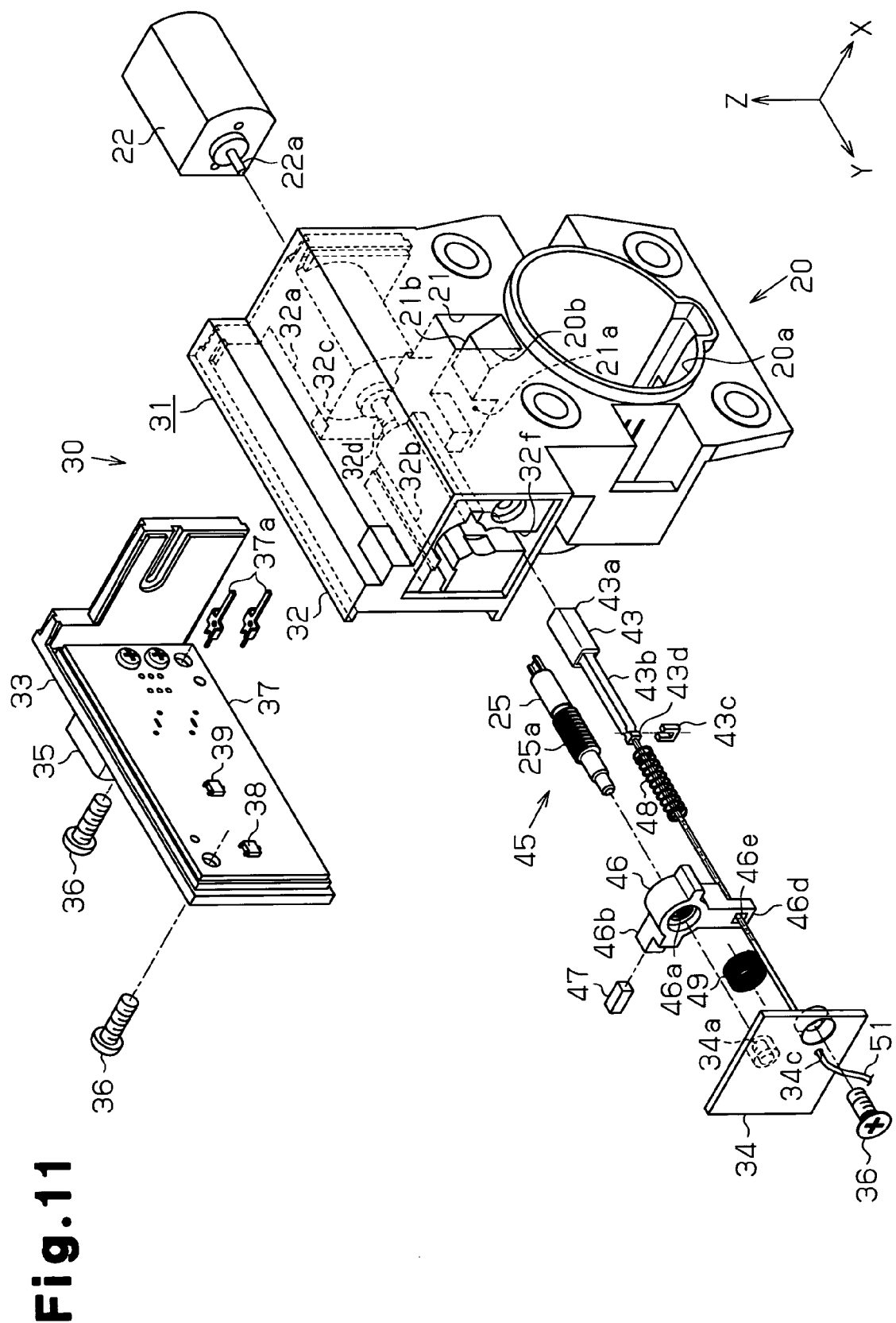
FIG. 11 is an exploded perspective view of the locking device arranged in the inlet.

Referring to FIGS. 4, 9, and 10, the locking device 30 includes a manual unlocking mechanism 50, which manually unlocks the hook 16. The manual unlocking mechanism 50 includes a wire 51, which serves as an operation member. The wire 51 has one end (inner end) fixed to the spring support 23c of the lock bar 23 and another end (outer end) drawn out of the locking device 30 through an insertion hole 34c, which extends through the spring seat 34b of the second lid 34. The wire 51 extends through the spring 28. In this example, the wire 51 is arranged in a path along which the lock bar 23 moves. This allows for use of the wire 51 without any significant changes in the shape or size of the locking device 30.

As shown in FIGS. 9 and 10, the outer end of the wire 51 is drawn into an operation box 52 through an insertion hole 52a, which extends through a wall of the operation box 52. The user uses the operation box 52 to manually operate the locking device 30. A ring 53 is coupled to the outer end of the wire 51 to keep the wire 51 in the drawn out state. An L-shaped mount 56 is arranged in the operation box 52 to hook the ring 53. When the ring 53 is hooked to the mount 56, the wire 51 is held so that its drawn out part is maintained at a predetermined length. The ring 53 and the mount 56 form an unlock holding member.

When the wire 51 is pulled outward from the locking device 30, the lock bar 23 is moved toward the unlock position. When the lock bar 23 is arranged at the lock position by the stopper 26, the buffer opening 23a includes the clearance 23b. Thus, the lock bar 23 is moved to the unlock position without interference by the stopper 26. This compresses the spring 28 between the lock bar 23 and the second lid 34. Accordingly, when the wire 51 is released, the urging force of the compressed spring 28 moves the lock bar 23 to the lock position. The insertion holes 34c and 52a, which are arranged in accordance with the positional relationship of the locking device 30 and the operation box 52 determine the path along which the wire 51 moves. In this manner, the insertion holes 34c and 52a function as a guide. That is, the direction in which the wire 51 moves may be varied by the insertion holes 34c and 52a.

The operation box 52 is arranged in the vehicle 1. Thus, the user must unlock a door with the electronic key 80 and enter the vehicle 1 to use the operation box 52. In other words, only the user of the vehicle 1 can perform the manual unlocking.

The assembly of the locking device 30 will now be discussed with reference to FIG. 4. The locking device 30 is assembled by coupling components in the longitudinal direction of the main body 32 excluding the first lid 33.

First, the motor 22 is inserted into the motor accommodation compartment 32a in the longitudinal direction of the main body 32. The drive shaft 22a is inserted into the insertion bore 32d of the partition wall 32c to project into the component accommodation compartment 32b. Then, the motor 22 is fastened to the motor accommodation compartment 32a by the screws 36. The sleeve 24 is arranged between the drive shaft 22a and the insertion bore 32d (refer to FIG. 7).

Then, the magnet 27 is retained in the magnet retainer 26b of the stopper 26. The female threaded portion 26a of the stopper 26 is mated with the male threaded portion 25a of the transmission shaft 25. Further, the lower rail 26d of the stopper 26, which is mated with the transmission shaft 25, is inserted into the buffer opening 23a of the lock bar 23, and the recess 26e of the lower rail 26d is abutted against the wall of the buffer opening 23a. The inner end of the wire 51 is fixed to the spring support 23c of the lock bar 23.

The transmission shaft 25, the stopper 26, and the lock bar 23, in a state coupled to one another, are inserted into the component accommodation compartment 32b in the longitudinal direction of the main body 32. Here, the transmission shaft 25 is fixed to the drive shaft 22a. Further, the lock bar 23 is fitted into the lock bar guide groove 32g of the main body 32, and the lower rail 26d of the stopper 26 is fitted into the lower guide groove 32f of the main body 32.

Subsequently, the inner end of wire 51 is inserted through the spring 28 and fixed to the spring support 23c of the lock bar 23. The outer end of the wire 51 is inserted through the insertion hole 34c of the second lid 34 and drawn out of the main body case 31. Then, the second lid 34 is attached to the main body 32. Here, the outer end of the spring 28 is inserted through the spring seat 34b of the second lid 34.

Then, the substrate 37, on which the first and second hall elements 38 and 39 are mounted, is fixed to the first lid 33. The substrate 37 is connected to the external connector 35, which is electrically connected to the motor 22. Then, the first lid 33 is coupled to the main body 32. The locking device 30 is assembled by carrying out these procedures.

The outer end of the wire 51 is inserted through the insertion hole 52a of the operation box 52 and drawn into the operation box 52. Then, the ring 53 is coupled to the outer end of the wire 51.

The operation of the locking device 30 when charging the battery 4 with the power feeding plug 10 will now be discussed with reference to FIGS. 5 to 10.

First, the operation unit 17 of the power feeding plug 10 is pushed to tilt the hook 16 to the unlock position as shown by the double-dashed lines in FIG. 2. Then, referring to FIGS. 5 and 6, the power feeding plug 10 is inserted into the inlet 20 so that the hook 16 enters the cavity 21a of the catch 21. In this state, the connection terminals 15 of the power feeding plug 10 are connected to the connection terminals 29 of the inlet 20. This locates the hook 16 above the projection 21b of the catch 21, as shown by the double-dashed lines in FIG. 6.

Figure 6:
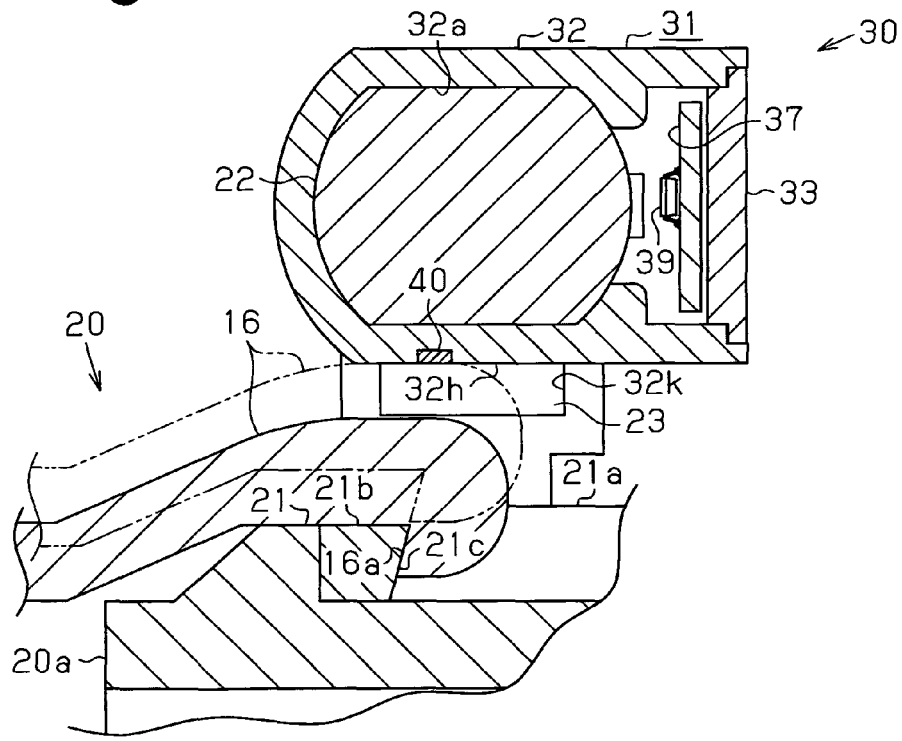
FIG. 6 is a cross-sectional view of the locking device taken along line A-A in FIG. 5 and illustrates the hook in an unlocked state.

The operation unit 17 is released in this state so that the hook 16 moves to the close position and engages the projection 21b, as shown by the solid lines in FIG. 6. This connects the power feeding plug 10 to the inlet 20. When the detection sensor 40 detects the engagement of the hook 16 and the projection 21b (catch 21), the detection sensor 40 sends a detection signal to the charge ECU 75. When receiving the detection signal from the detection sensor 40, the charge ECU 75 sets a hook engagement flag to on in the memory 75a. The charge ECU 75 also sets an ID verification flag to on based on a notification from the verification ECU 71. In this case, the hook engagement flag and the ID verification flag are both on. Thus, the charge ECU 75 sends a drive signal to the motor 22 and starts a locking operation with the hook 16.

When the motor 22 is driven, the transmission shaft 25 is rotated. The mating of the male threaded portion 25a and the female threaded portion 26a converts rotation of the transmission shaft 25 into linear movement of the stopper 26 in the longitudinal direction of the main body case 31. This starts to move the stopper 26 toward the lock position. In this state, the urging force of the spring 28 keeps the lock bar 23 in contact with the recess 26e of the stopper 26. Accordingly, the stopper 26 and the lock bar 23 both linearly move to the lock position.

Figure 7:
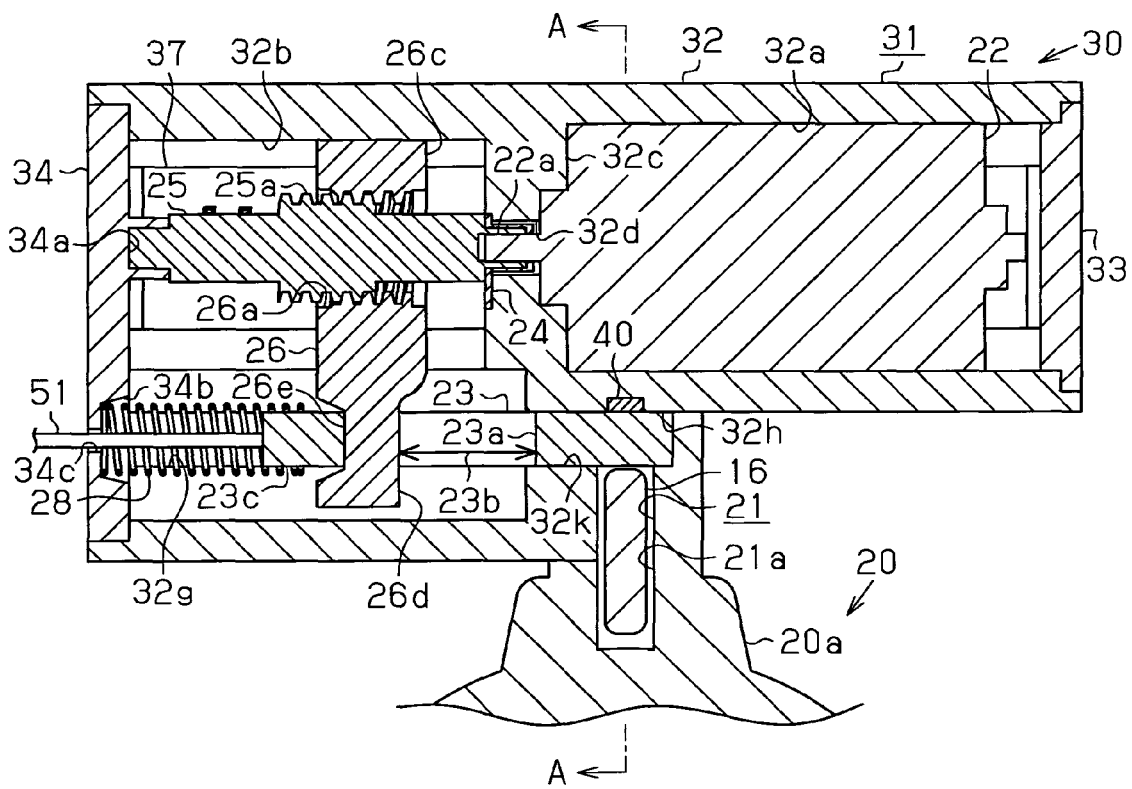
FIG. 7 is a cross-sectional view of the locking device shown in FIG. 4 and illustrates the hook in a locked state.
Figure 8:
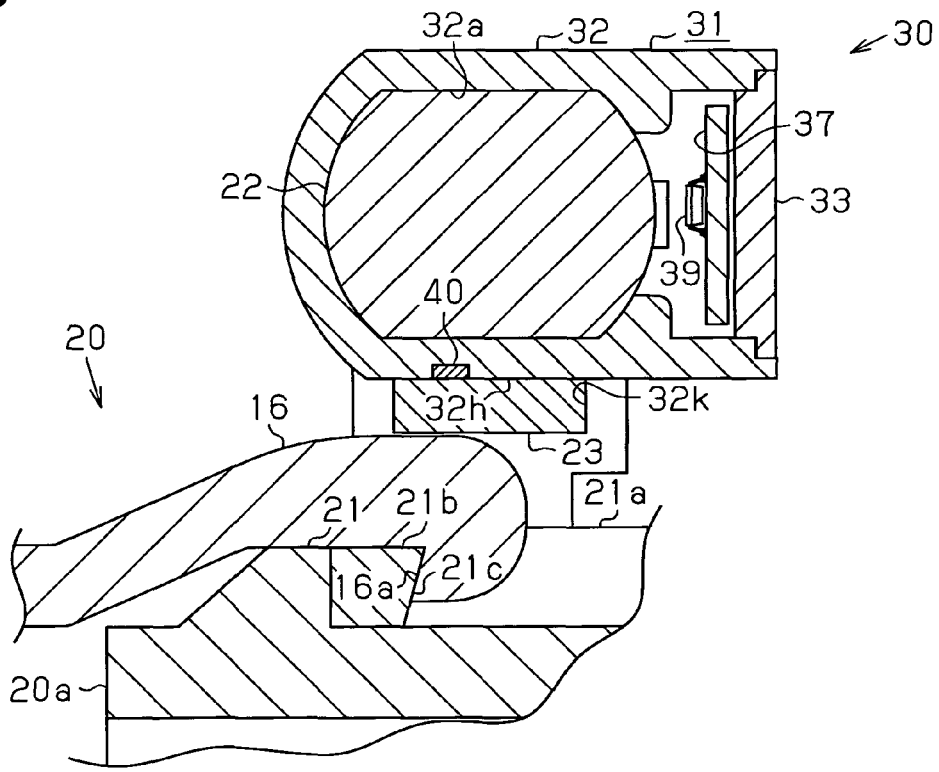
FIG. 8 is a cross-sectional view of the locking device taken along line A-A in FIG. 7.

When the lock bar 23 reaches the lock position, the magnet 27 of the stopper 26 is located at a position facing toward the second hall element 39. Thus, the second hall element 39 detects that the lock bar 23 has reached the lock position. This deactivates the motor 22 and holds the lock bar 23 above the hook 16 at the lock position, as shown in FIGS. 7 and 8. As a result, the engagement of the hook 16 with the projection 21b is locked, and the hook 16 cannot be moved. In the locked state, the charging switch 62 is switched on. Then, current flows from the power feeding plug 10 to the inlet 20 to start charging the battery 4.

When the hook 16 is in the locked state, an unauthorized person, for example, may attempt to disconnect the power feeding plug 10 from the inlet 20 by forcibly pulling the power feeding plug 10. In such a case, the forcible pulling would produce a pulling load on the hook 16 that acts to move the hook 16 upward. However, the lock bar 23 is located above the hook 16. Thus, the lock bar 23 restricts upward movement of the hook 16 and keeps the hook 16 engaged with the catch 21. This keeps the power feeding plug 10 connected to the inlet 20 and prevents unauthorized disconnection of the power feeding plug 10.

When connecting the power feeding plug 10 to the inlet 20, the hook 16 of the power feeding plug 10 may not be completely engaged with the catch 21 of the inlet 20 for one reason or another. For example, the hook 16 may get caught at the peak of the projection 21b. In such a state, the engagement of the hook 16 and the projection 21b would be incomplete. In such an incomplete engagement state, the hook 16 of the power feeding plug 10 would interfere with the movement of the lock bar 23 to the lock position.

In this state, the hook 16 would obstruct movement of the lock bar 23. However, the drive force from the motor 22 would continue to move the stopper 26. In this case, the stopper 26 mechanically separates the motor 22 and the lock bar 23. Thus, the drive force of the motor 22 is not transmitted to the lock bar 23 even if the motor 22 continues to produce rotation. This prevents the lock bar 23 from being forcibly moved when the lock bar 23 is obstructed by an obstacle. In this manner, the lock bar 23 remains in a state stopped by an obstacle (hook 16). Hence, excessive load is not applied to the motor 22, the transmission shaft 25, the stopper 26, the lock bar 23, and the hook 16. This prevents these components from being damaged.

When the hook 16 is in an incomplete engagement state, the power feeding plug 10 may be slightly moved in upward, downward, leftward, and rightward directions like when aligning the power feeding plug 10 with the inlet 20 (power receiving connector). This would release the hook 16 so that the hook 16 completely engages the catch 21. Then, the urging force of the spring 28 automatically moves the lock bar 23 to the lock position. Thus, when a state of incomplete engagement ends, the lock bar 23 moves to the lock position. This avoids a situation in which the power feeding plug 10 is left without being attended to in an unlocked state.

When the charging of the battery 4 is completed, the user operates the disconnection switch 76 to disconnect the power feeding plug 10 from the inlet 20. When the disconnection switch 76 is operated, the disconnection switch 76 sends an operation signal to the charge ECU 75. When receiving the operation signal from the disconnection switch 76, the charge ECU 75 sets a disconnection operation flag to on in the memory 75a. Since the ID verification flag and the disconnection operation flag are both on, the charge ECU 75 sends a drive signal to the motor 22 to produce reverse rotation and start an unlocking operation with the locking device 30.

As the motor 22 produces reverse rotation, the transmission shaft 25 is rotated in a direction opposite to the direction for moving the stopper 26 toward the lock position. This moves the stopper 26 to the unlock position and moves the lock bar 23 to the unlock position. Thus, the stopper 26 and the lock bar 23 linearly move together toward the unlock position.

When the lock bar 23 reaches the unlock position, the magnet 27 of the stopper 26 is located at a position facing toward the first hall element 38. Thus, the first hall element 38 detects that the lock bar 23 has reached the unlock position. This deactivates the motor 22 and holds the lock bar 23 at a position separated from the hook 16, that is, the unlock position, as shown in FIGS. 5 and 6. This unlocks the hook 16. Thus, by pushing the operation unit 17, the hook 16 may be tilted to the open position to disconnect the power feeding plug 10 from the inlet 20.

In the locked state shown in FIG. 9, the lock bar 23 may become immovable from the lock position to the unlock position due to an abnormality in, for example, the motor 22 or the charge ECU 75. In such an abnormal state, the locked state cannot be canceled no matter how many times the disconnection switch 76 is pushed. Thus, the power feeding plug 10 cannot be disconnected from the inlet 20.

However, in the locking device 30 of the present embodiment, the stopper 26 mechanically separates the motor 22 and the lock bar 23. Further, the wire 51, which allows for manual operation of the lock bar 23, is coupled to the spring support 23c of the lock bar 23. Thus, when the locking device 30 or the charge ECU 75 is abnormal, the user may use the operation box 52 to manually operate the lock bar 23. More specifically, the user has the electronic key 80 verified to unlock a door and then enters the vehicle 1. In the vehicle 1, the user pulls a handle 55 on a lid 54 of the operation box 52, which is arranged in the vehicle 1, to open the operation box 52. The user pulls and hooks the ring 53 on the mount 56. This moves the lock bar 23 from the lock position to the unlock position against the urging force of the spring 28 and shifts the hook 16 from the locked state to the unlocked state.

In this state, the stopper 26 is not moved and remains held at the lock position. However, the lower rail 26d of the stopper 26 moves relative to the lock bar 23 in the buffer opening 23a. Thus, the lock bar 23 is movable to the unlock position. Further, as shown in FIG. 10, when the user hooks the ring 53 to the mount 56 in the operation box 52, the lock bar 23 is held at the unlock position and the hook 16 is unlocked. In other words, the hooking of the ring 53 to the mount 56 keeps the wire 51 in a drawn out state and the hook 16 in an unlocked state.

In this manner, even when an abnormality occurs in the locking device 30 or the charge ECU 75 in the locked state, the locking device 30 may be manually operated to perform an unlocking operation so that the power feeding plug 10 can be disconnected from the inlet 20. Thus, as long as key verification is completed in the vehicle 1, a start switch may be pushed to activate the hybrid system 3 and start the engine. This allows for the vehicle 1 to be driven to a car dealer or the like so that the locking device 30 can be repaired.

In the present embodiment, the power feeding plug 10 is inserted into the inlet 20 to engage the hook 16 with the projection 21b (catch 21). In this state, the motor 22 is driven to move the lock bar 23 to the lock position and hold the hook 16 in the locked state. Thus, an unauthorized person cannot disconnect the power feeding plug 10 from the inlet 20. This prevents theft of the power feeding plug 10.

Further, even when an abnormality occurs in the motor 22 or the charge ECU 75, and the charge ECU 75 cannot move the lock bar 23 from the position, the user may pull the wire 51 of the manual unlocking mechanism 50 to manually move the lock bar 23 to the unlock position. Thus, even when an abnormality occurs in the motor 22 or the charge ECU 75, the user can unlock the hook 16.

The manual unlocking mechanism 50 of the first embodiment in the locking device 30 of the present embodiment has the advantages described below.

(1) The inlet 20 includes the locking device 30. Thus, when the power feeding plug 10 is connected to the inlet 20, an unauthorized person is prevented from disconnecting the power feeding plug 10 from the inlet 20. Further, the spring 28 mechanically separates the lock bar 23 and the stopper 26, and the wire 51 is coupled to the lock bar 23. Thus, even when an abnormality occurs in the motor 22 or the like and the lock bar 23 cannot be driven, the user may manually pull the wire 51 to move the lock bar 23 to the unlock position.

(2) The mount 56 used to hook the ring 53 of the wire 51 is arranged in the operation box 52 (or on a wall), which is installed in the vehicle 1. Thus, when the ring 53 of the wire 51 is hooked to the mount 56, the wire 51 is maintained in the drawn out state. This maintains an unlocked state when the user releases the ring 53 and thereby improves convenience.

(3) The operation member is the wire 51. Thus, the wire 51 can easily be drawn into the operation box 52 by using guides such as the insertion holes 34c and 52a. This provides freedom for the layout of the wire 51 and facilitates arrangement of the wire 51.

(4) The stopper 26 moves integrally with the lock bar 23 in a state in which the stopper 26 is abut on the buffer opening 23a of the lock bar 23. Further, when the lock bar 23 is immovable due to an abnormality, just the stopper 26 may be moved in the buffer opening 23a of the lock bar 23. In other words, the stopper 26 mechanically separates the motor 22 and the lock bar 23. Thus, manual operation of the wire 51 allows just the lock bar 23 to be moved to the unlock position. Accordingly, the user can easily cancel the locked state.

(5) The operation box 52 of the manual unlocking mechanism 50 is arranged in the vehicle 1. Thus, even when someone attempts to manually cancel the locked state in an authorized manner, that person would not be permitted to enter the vehicle 1. This prevents such an unauthorized person from manually canceling the locked state.

(6) The lock bar 23 and the motor 22 are sequentially accommodated in and fastened to the main body case 31. Thus, the locking device 30 may be easily assembled.

Second Embodiment

A manual unlocking structure for a power feeding plug locking device according to a second embodiment of the present invention applied to a power receiving connector of a plug-in hybrid vehicle will now be discussed with reference to FIGS. 11 to 15. The description hereafter will center on differences from the first embodiment. The manual unlocking mechanism of the second embodiment is similar to that of the first embodiment.

The structure of the locking device 30 in the second embodiment will now be discussed.

A lock bar 43, which serves as a restriction member (in broad terms, a fastening member), is rod-shaped. The lock bar 43 includes a lock portion 43a and a shaft portion 43b. The lock portion 43a restricts movement of the hook 16, and the shaft portion 43b is coupled to the lock portion 43a. A spring 48, which serves as an urging member, is arranged on the shaft portion 43b. The shaft portion 43b has an outer diameter that is smaller than that of the lock portion 43a.

The stopper 46 has a lower part including a lower rail 46d, which is fitted to a lower guide groove 32f, which is formed in an inner lower part of the main body 32. The lower rail 46d guides the linear reciprocation of the stopper 46 in the axial direction of the lock bar 43. The lower rail 46d of the stopper 46 includes a bore 46e, which serves as a recess into which the shaft portion 43b of the lock bar 43 is inserted. The bore 46e allows for the lock bar 43 to be coupled to the stopper 46 and movable relative to the stopper 46.

The spring 48 is arranged on the shaft portion 43b of the lock bar 43. The spring 48 is arranged on the shaft portion 43b between the lock portion 43a and the lower rail 46d of the stopper 46. The shaft portion 43b has a distal end to which a clip 43c is attached to prevent separation of the lock bar 43 from the stopper 46. The clip 43c serves as a separation prevention member. A clip groove 43d is formed in the distal end of the shaft portion 43b to which the clip 43c is attached.

The spring 48 constantly urges the lock bar 43 away from the stopper 46. Thus, the spring 48 keeps the clip 43c in contact with the stopper 46. Movement of the stopper 46 from the lock position to the unlock position in a state in which the clip 43c is in contact with the stopper 46 moves the lock bar 43 from the lock position to the unlock position.

In the same manner as the first embodiment, the locking device 30 of the second embodiment includes a manual unlocking mechanism 50 that manually moves the lock bar 43 from the lock position to the unlock position, or manually unlocks the hook 16. The wire 51 of the manual unlocking mechanism 50 has one end connected to the distal end of the shaft portion 43b in the lock bar 43.

The operation of the locking device 30 in the second embodiment will now be discussed with reference to FIGS. 12 to 15.

Figure 12:
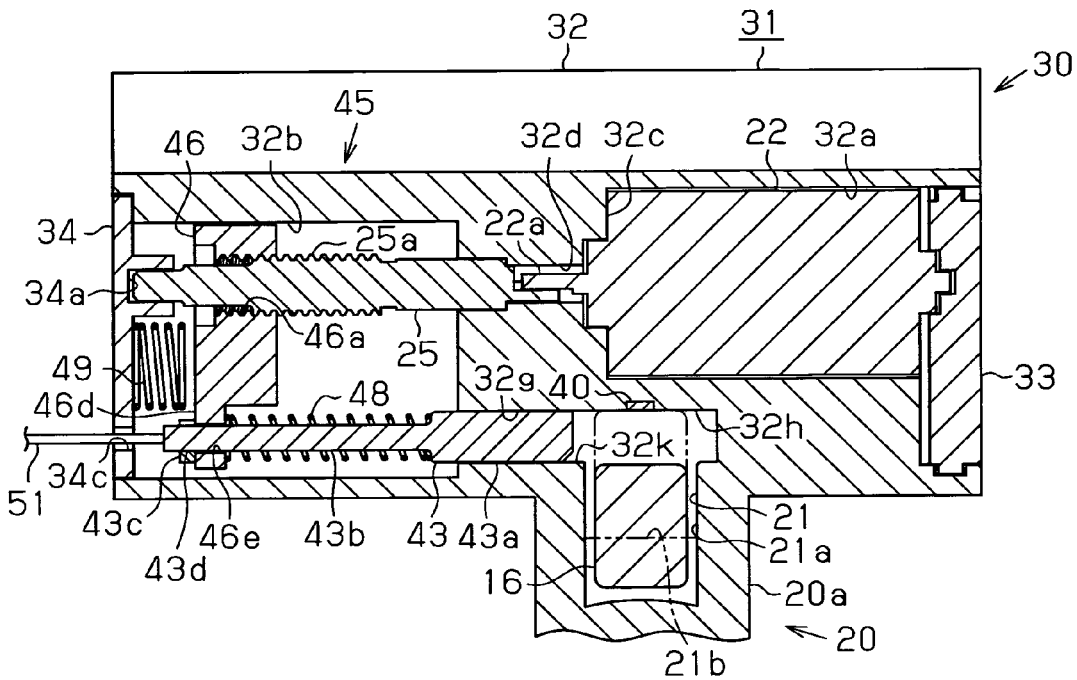
FIG. 12 is a cross-sectional view of the locking device shown in FIG. 11 and illustrates engagement of the hook in the power feeding plug.
Figure 13:
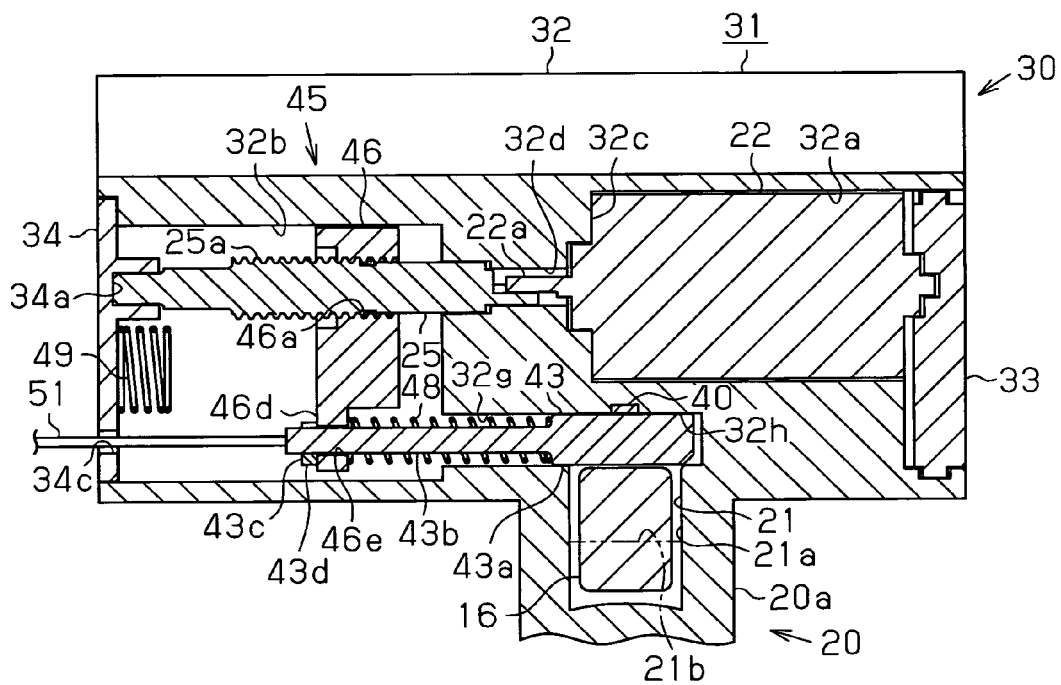
FIG. 13 is a cross-sectional view of the locking device shown in FIG. 11 and illustrates the hook in a locked state.

Referring to FIG. 12, when the motor 22 is driven in an unlocked state in which the hook 16 is free from restriction, the transmission shaft 25 is rotated. The mating of the male threaded portion 25a of the transmission shaft 25 and a female threaded portion 46a of the stopper 46 converts rotation of the transmission shaft 25 into linear movement of the stopper 46 in the longitudinal direction of the main body case 31 (axial direction of the lock bar 43). This starts to move the stopper 46 toward the motor 22, that is, the lock position. When the stopper 46 moves toward the lock position, the urging force of the spring 48 keeps the clip 43c in contact with the stopper 46. Thus, the lock bar 43 linearly moves together with the stopper 46 toward the lock position. As shown in the state of FIG. 13, when the lock bar 43 is located at the lock position, the hook 16 is held in a locked state, and movement of the hook 16 is restricted.

Subsequently, when the charging of the battery 4 is completed, the user disconnects the power feeding plug 10 from the inlet 20. When the disconnection switch 76 is operated, the motor 22 produces rotation, the direction of which is reversed from that produced during the locking operation. This starts moving the stopper 46 to the unlock position. When the stopper 46 moves to the unlock position, the lower rail 46d of the stopper 46 is in contact with the clip 43c. Thus, the lock bar 43 linearly moves together with the stopper 46 toward the lock position.

As shown in FIG. 12, when the lock bar 43 reaches the unlock position, movement of the lock bar 43 is stopped. In this state, the lock bar 43 is located at a position separated from the hook 16, and the hook 16 is unlocked.

Figure 14:
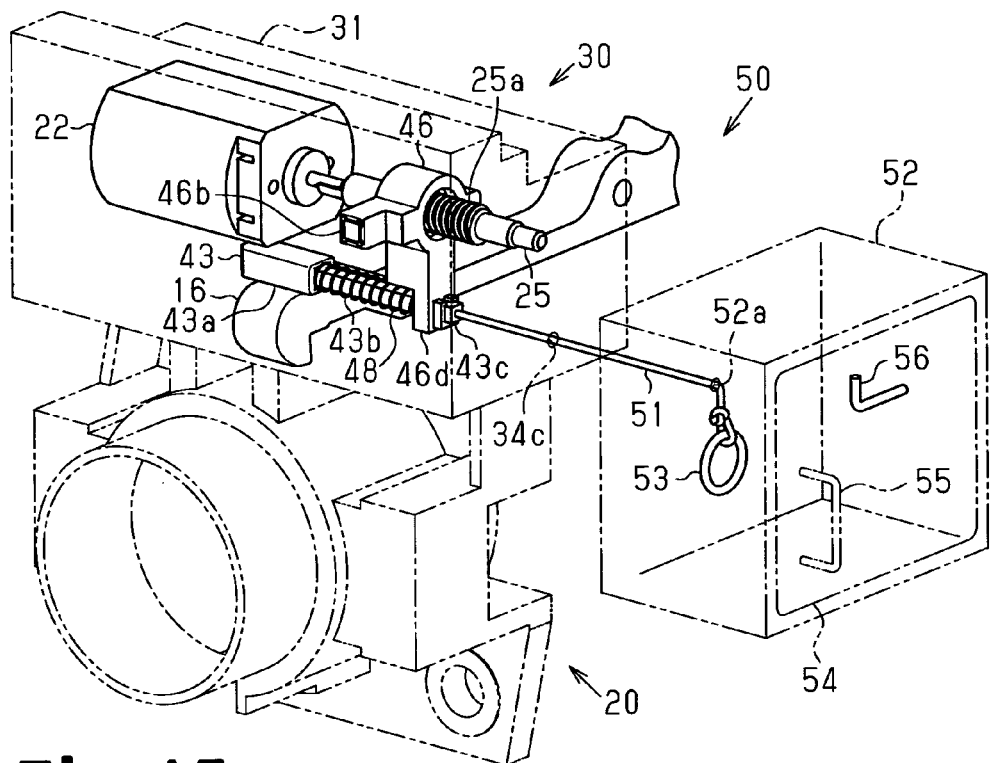
FIG. 14 is a perspective view of the manual unlocking mechanism arranged in the locking device of FIG. 11.

In the locked state shown in FIG. 14, the lock bar 43 may become immovable from the lock position to the unlock position due to an abnormality in, for example, the motor 22 or the charge ECU 75. In such an abnormal state, the user pulls the handle 55 on the lid 54 of the operation box 52 and pulls the ring 53 to move the lock bar 43 to the unlock position. In this state, the stopper 46 is not moved and remains held at the lock position. However, the shaft portion 43*b* of the lock bar 43 moves relative to the stopper 46 in the bore 46*e*. Thus, the lock bar 43 is movable. In this manner, in the locking device 30 of the second embodiment, the lock bar 43 may be manually moved in the same manner as the first embodiment.

Figure 15:
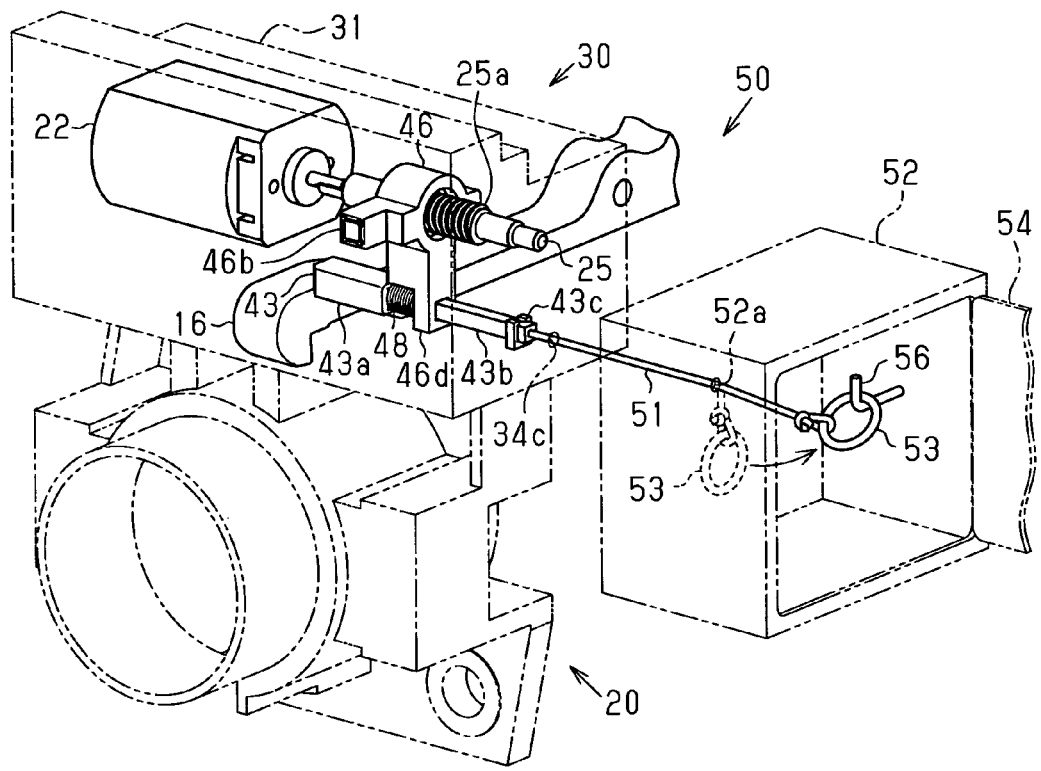
FIG. 15 is a perspective view of the manual unlocking mechanism of FIG. 14 in a manually unlocked state.

Further, as shown in FIG. 15, when the user hooks the ring 53 to the mount 56 in the operation box 52, the lock bar 43 is held at the unlock position. In other words, the hooking of the ring 53 to the mount 56 keeps the wire 51 in a drawn out state. This fixes the position of the lock bar 43 and holds the hook 16 in an unlocked state.

The male threaded portion 25*a* of the transmission shaft 25 and the female threaded portion 46*a* of the stopper 46 forms a movement conversion mechanism, which includes an idle rotation mechanism. When the stopper 46 moves beyond the lock position or unlock position as the transmission shaft 25 continues to rotate, the idle rotation mechanism cuts the transmission of drive force from the transmission shaft 25 to the stopper 46. More specifically, the male threaded portion 25*a* is formed on the transmission shaft 25 only at the part required to move the stopper 46 between the lock position and the unlock position. Thus, the drive force of the transmission shaft 25 is transmitted to the stopper 46 only by the part in which the male threaded portion 25*a* is formed. Accordingly, when the transmission shaft 25 continues to rotate as the stopper 46 moves out of its movement range between the lock position and the unlock position, the transmission shaft 25 rotates idly and the stopper 46 stops moving. The idle rotation mechanism may also be included in the movement conversion mechanism of the first embodiment.

A recovery spring 49 is fixed to the surface of the second lid 34 that faces toward the stopper 46. Even when the idle rotation mechanism functions, the stopper 46 may still slightly move beyond the unlock position due to inertia. In such a case, the recovery spring 49 urges the stopper 46 in the direction of the lock position to return the stopper 46 to the correct unlock position. That is, movement of the stopper 46 beyond the unlock position results in the stopper 46 compressing the recovery spring 49 and urging the stopper 46 to the unlock position.

In the same manner, even when the idle rotation mechanism functions, the stopper 46 may still slightly move beyond the lock position due to inertia. In such a case, the spring 48, which is fitted on the lock bar 43, urges the stopper 46 in the direction of the unlock position to return the stopper 46 to the correct lock position. That is, movement of the stopper 46 beyond the lock position results in the stopper 46 compressing the spring 48 and urging the stopper 46 to the lock position.

In addition to advantages (1) to (3) and (5) to (6) of the first embodiment, the manual unlocking mechanism 50 of the second embodiment in the locking device 30 has the advantage described below.

(7) The lock bar 43 is inserted into the bore 46*e*, which is formed in the stopper 46, in a movable manner. Thus, by coupling the stopper 46 and the lock bar 43, the direction in which the lock bar 43 and stopper 46 moves is set to only the axial direction of the transmission shaft 25. Further, the stopper 46 mechanically separates the motor 22 and the lock bar 43. Thus, even though the spring 48 urges the lock bar 43 toward the lock position, the wire 51 may be used to manually move just the lock bar 43 to the unlock position. Accordingly, the user can easily cancel the locked state.

Third Embodiment

A manual unlocking structure for a power feeding plug locking device according to a third embodiment of the present invention applied to a power receiving connector of a plug-in hybrid vehicle will now be discussed with reference to FIGS. 20 to 25. The third embodiment includes a locking device 90, which differs from the first embodiment. The description hereafter will center on differences from the first embodiment.

The structure of the locking device 90 in the second embodiment will now be discussed.

As shown in FIGS. 20 to 25, the locking device 90 includes a main body case 92, which forms a shell of the locking device 90. The main body case 92 is formed integrally with the upper part of an outer surface 20*a* of an inlet 20. The main body case 92 includes a catch 21. In the same manner as the first embodiment, the catch 21 includes a cavity 21*a* and a projection 21*b*, which is engageable with a hook 16.

An engagement member 91, which integrally includes the projection 21*b* of the catch 21, is arranged in the cavity 21*a*. The engagement member 91 is linearly movable in a widthwise direction (lateral direction in the plane of FIGS. 20 and 21) of the cavity 21*a*. The engagement member 91 extends in a direction perpendicular to the insertion direction of the hook 16 and is longer than the width of the cavity 21*a*. The engagement member 91 is box-shaped and has a central part in which the projection 21*b* is arranged. A slope 91*a* extends from the engagement member 91 to guide the hook 16 to the projection 21*b*. Further, the engagement member 91 includes a left extension 91*b*, which extends from the left side of the projection 21*b*, and a right extension 91*c*, which extends from the right side of the projection. The left extension 91*b* is longer than the right extension 91*c* (refer to FIG. 22). In the third embodiment, the engagement member 91 functions as a fastening member.

The locking device 90 includes a manual unlocking mechanism 97. The manual unlocking mechanism 97 allows for manual unlocking of the engagement of the hook 16 and projection 21*b* (engagement member 91). That is, the manual unlocking mechanism 97 manually unlocks the power feeding plug 10 and the inlet 20 (power receiving connector). In detail, referring to FIGS. 24 and 25, the engagement member 91 is movable between an engagement position ((i.e., lock position, refer to FIG. 24) and a non-engagement position (i.e., unlock position, refer to FIG. 25). At the engagement position, the projection 21*b* of the catch 21 is exposed in the cavity 21*a* and can be engaged with the hook 16. At the non-engagement position, the projection 21*b* is not exposed in the cavity 21*a* and cannot be engaged with the hook 16. The locking device 90 includes a movement passage 94, in which the engagement member 91 is movable between the engagement position and the non-engagement position. An urging spring 93, which urges the engagement member 91 toward the non-engagement position (toward the left as viewed in FIG. 24), is arranged in the movement passage 94. In this example, the urging spring 93 has one end that comes into contact with a right end of the right extension 91*c* of the engagement member 91 and another end fixed to the wall of the movement passage 94 facing toward the right end of the right extension 91*c*.

Figure 20:
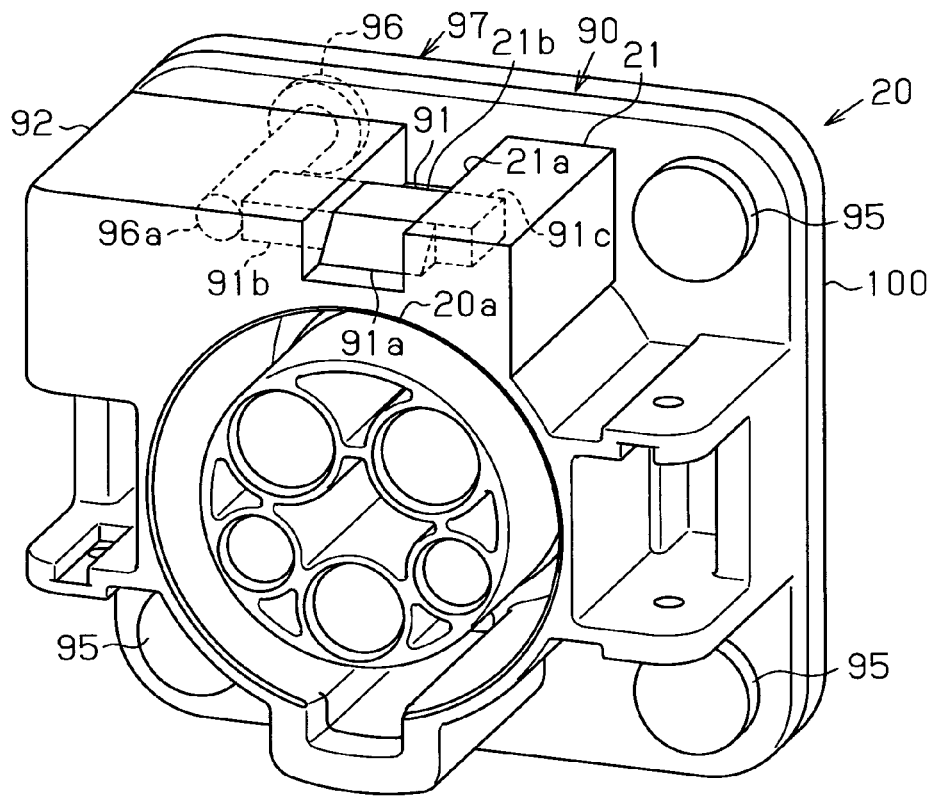
FIG. 20 is a perspective view showing the locking device arranged in the inlet.
Figure 21:
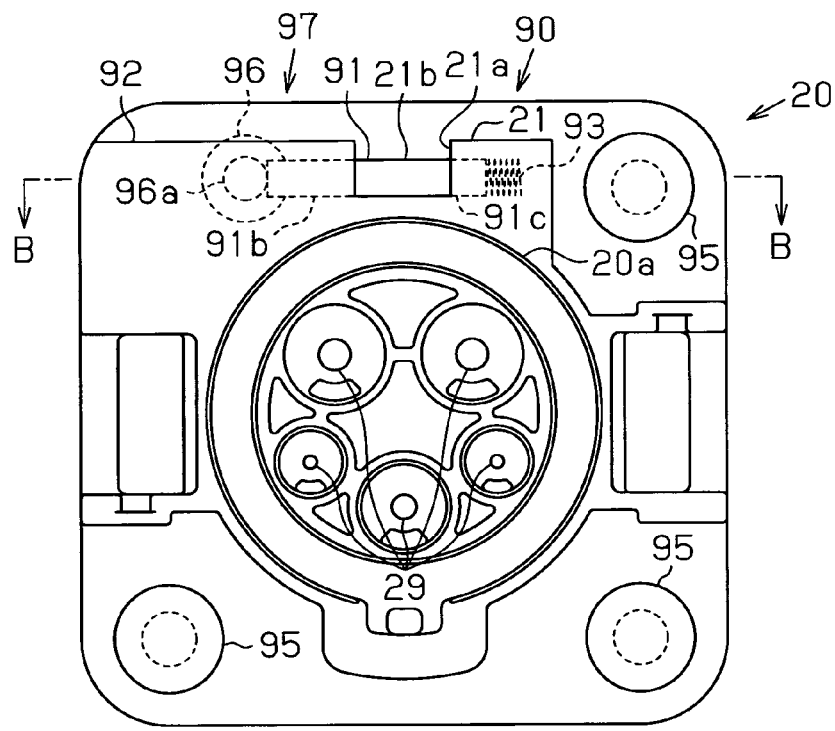
FIG. 21 is a front view of the locking device shown in FIG. 20.
Figure 22:
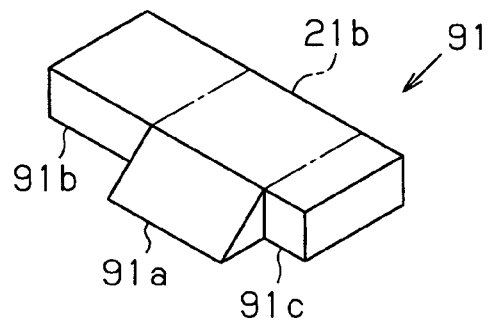
FIG. 22 is a perspective view of an engagement member arranged in the locking device shown in FIG. 20.
Figure 23:
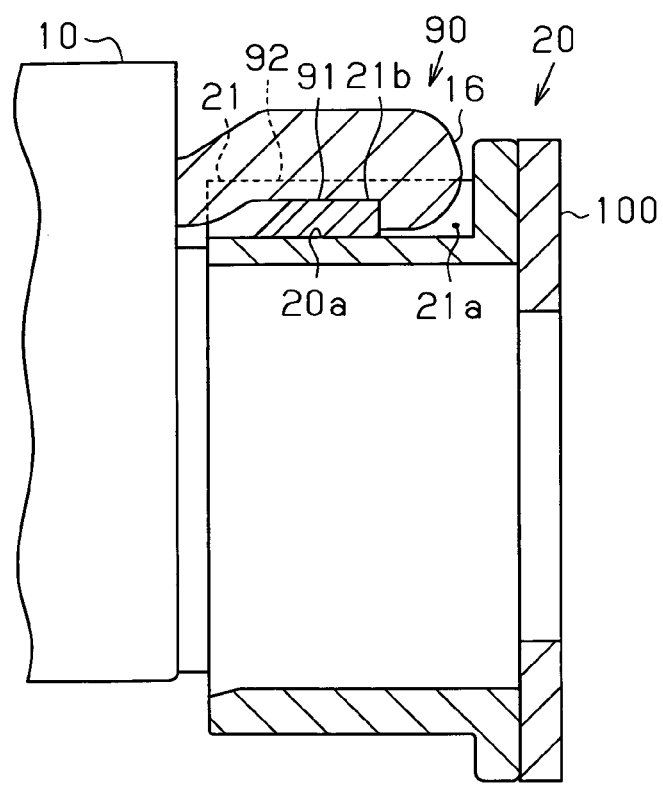
FIG. 23 is a cross-sectional view of the locking device shown in FIG. 20 in a state in which the power feeding plug is connected to the inlet.

As shown in FIGS. 20 and 21, three fastening bolts 95 fasten the inlet 20 to a vehicle body 100. The three fastening bolts 95 are fastened to three corners of the inlet 20 from the outer side of the vehicle. The fastening bolts 95 are preferably special bolts that require a special tool for removal to prevent theft.

A restriction bolt 96 is fastened to a rear side of the inlet 20 at the corner free from the fastening bolts 95, namely, the upper left corner. The restriction bolt 96 fastens the inlet 20 to the vehicle body 100. Additionally, the restriction bolt 96 is used to restrict movement of the engagement member 91 and hold the engagement member 91 at the engagement position (i.e., the lock position). The restriction bolt 96 functions as an operation member.

Figure 24:
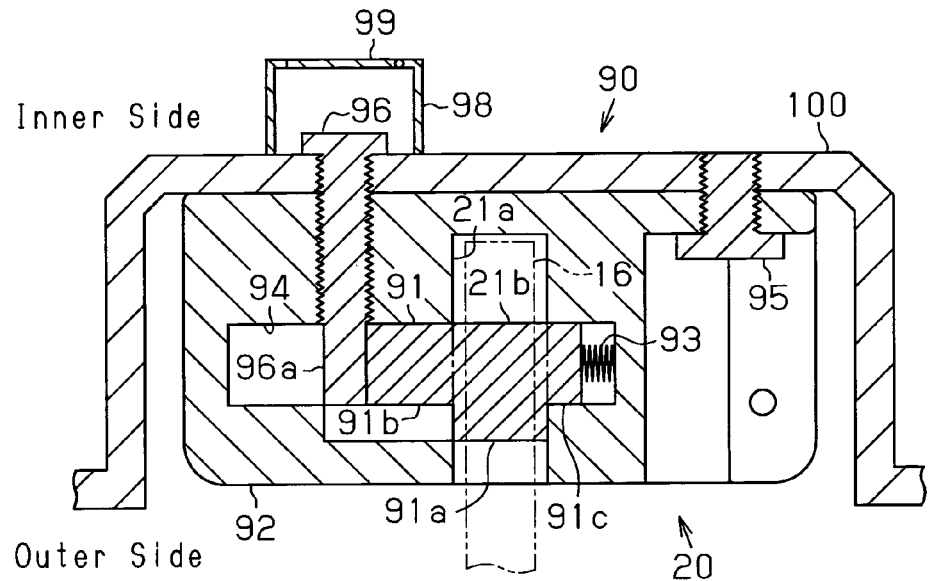
FIG. 24 is a cross-sectional view of the locking device taken along line B-B in FIG. 21 and illustrates a locked state.
Figure 25:
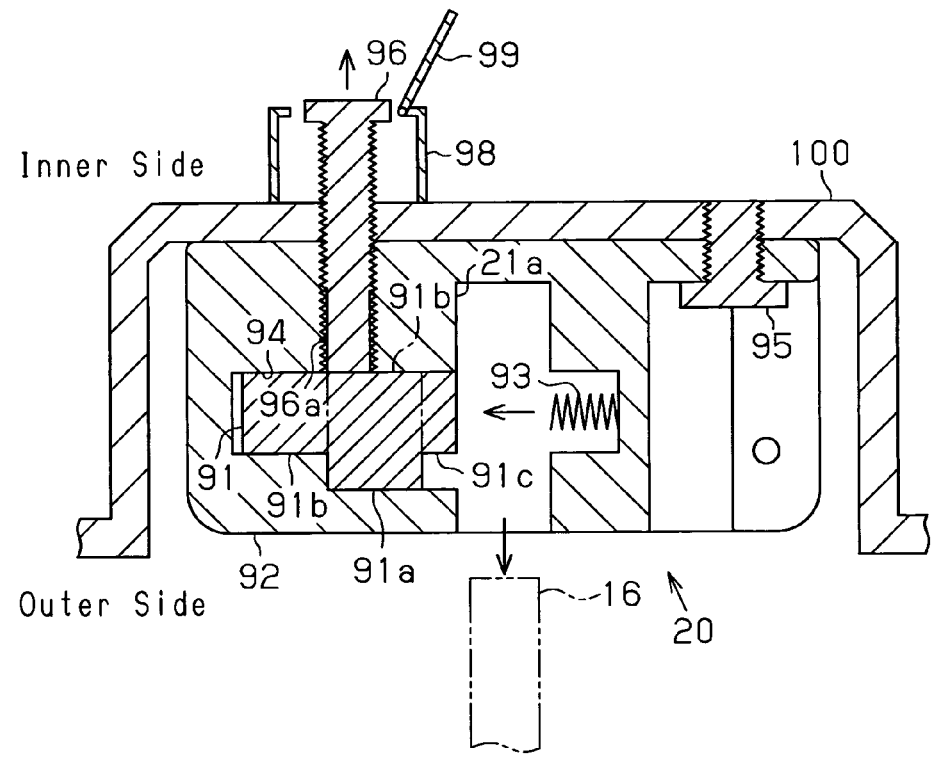
FIG. 25 is a cross-sectional view of the locking device taken along line B-B in FIG. 21 and illustrates a manually unlocked state.

Referring to FIGS. 24 and 25, an operation box 98 is coupled to the vehicle body 100. The operation box 98 is arranged in the vehicle at the opposite side of the locking device 90, which is arranged at the outer side of the vehicle body 100. The user uses the operation box 98 to manually unlock the engagement of the hook 16 with the projection 21b of the catch 21, that is, to manually cancel the locked state. The restriction bolt 96 of the locking device 90 includes a head, which is accommodated in the operation box 98, and extends from the inner side of the vehicle through the vehicle body 100. The restriction bolt 96 includes a distal portion 96a, which comes into contact with the left end of the left extension 91b of the engagement member 91. Contact by the distal portion 96a of the restriction bolt 96 with the left end of the left extension 91b restricts movement of the engagement member 91. In other words, the restriction bolt 96 holds the engagement member 91 at the engagement position in a state in which the urging spring 93 urges the engagement member 91 toward the non-engagement position. When the restriction bolt 96 is drawn from the vehicle, the engagement member 91 is released from the distal portion 96a of the restriction bolt 96. As a result, the urging force of the urging spring 93 moves the engagement member 91 from the engagement position to the non-engagement position.

The operation box 98 is arranged in the vehicle. Thus, the user must unlock a door with the electronic key 80 and enter the vehicle to use the operation box 98. In other words, only the user of the vehicle can operate the manual unlocking mechanism 97.

The operation of the locking device 90 will now be discussed with reference to FIGS. 24 and 25.

As shown in FIG. 24, when the power feeding plug 10 is connected to the inlet 20, the hook 16 engages the projection 21b of the engagement member 91. This state is referred to as a locked state. In the third embodiment, the locked state refers to a state in which the projection 21b (engagement member 91) and the hook 16 are engaged with each other.

When the charging of the battery 4 is completed, the user disconnects the power feeding plug 10 from the inlet 20. When the operation unit 17 is operated and the hook 16 tilts to the open position, the hook 16 is disengaged from the projection 21b of the engagement member 91. This state is referred to as an unlocked state. In the third embodiment, the unlocked state refers to a state in which the projection 21b (engagement member 91) and the hook 16 are not engaged from each other. Accordingly, in the unlocked state, the power feeding plug 10 may be disconnected from the inlet 20.

When an abnormality occurs in the locked state shown in FIG. 24, movement of the hook 16 to the open position may be hindered. In such an abnormal state, the power feeding plug 10 cannot be disconnected from the inlet 20.

However, in the locking device 90 of the third embodiment, the engagement member 91, which includes the projection 21b, is movable between the engagement position and the non-engagement position. Further, the restriction bolt 96, which is fastened to the inlet 20 (locking device 90), holds the engagement member 91 at the engagement position (lock position) and keeps the hook 16 in the engaged state, or the power feeding plug 10 in the locked state. Thus, when an abnormality occurs in the locking device 90, the user draws out the restriction bolt 96 of the manual unlocking mechanism 97 to manually unlock the power feeding plug 10. More specifically, the user has the electronic key 80 verified to unlock a door and then enters the vehicle. In the vehicle, the user opens a lid 99 of the operation box 98. Next, the user rotates and draws out the restriction bolt 96 from the inlet 20 (locking device 90). As a result, as shown in FIG. 25, the engagement member 91 is released from the distal portion 96a of the restriction bolt 96, and the urging force of the urging spring 93 moves the engagement member 91 from the engagement position to the non-engagement position. Since the projection 21b, which engages the hook 16, is moved out of the cavity 21a, the hook 16 can be removed from the cavity 21a. Thus, as long as key verification is completed in the vehicle, the start switch may be pushed to activate the hybrid system 3 and start the engine. This allows for the vehicle to be driven to a car dealer or the like so that the locking device 90 can be repaired.

The manual unlocking mechanism 97 of the second embodiment in the locking device 90 has the advantages described below.

(8) The inlet 20 includes the locking device 90. This prevents the power feeding plug 10, when connected to the inlet 20, from being disconnected from the inlet 20 just by pulling the power feeding plug 10. Further, in the locking device 90, the engagement member 91, which includes the projection 21b, is movable between the engagement position and the non-engagement position, and the restriction bolt 96 holds the engagement member 91 at the engagement position. Thus, when an abnormality occurs in the locking device 90 and the hook 16 cannot be moved, the user may draw out the restriction bolt 96 to move the engagement member 91 to the non-engagement position. This allows for the hook 16 to be removed from the cavity 21a.

(9) The operation box 98 of the manual unlocking mechanism 97 is arranged in the vehicle. Thus, even when an unauthorized person attempts to manually operate the locking device 90, the unauthorized person cannot enter the vehicle. This lowers the possibility of the locking device 90 being operated by an unauthorized person and prevents unauthorized manual unlocking.

(10) The restriction bolt 96 is used as an operation member. The restriction bolt 96 is also used as a bolt that fastens the inlet 20 (locking device 90) to the vehicle body 100. In this manner, the restriction bolt 96 is used in lieu of the fastening bolt 95. This reduces the number of bolts used in the manual unlocking mechanism 97.

Fourth Embodiment

A manual unlocking structure for a power feeding plug locking device according to a fourth embodiment of the present invention applied to a power receiving connector of a plug-in hybrid vehicle will now be discussed with reference to FIGS. 26 and 27. In the fourth embodiment, the manual unlocking structure of the locking device 90 differs from the third embodiment. The description hereafter will center on differences from the third embodiment.

The manual unlocking mechanism 97 of the locking device 90 in the fourth embodiment will now be discussed.

Figure 26:
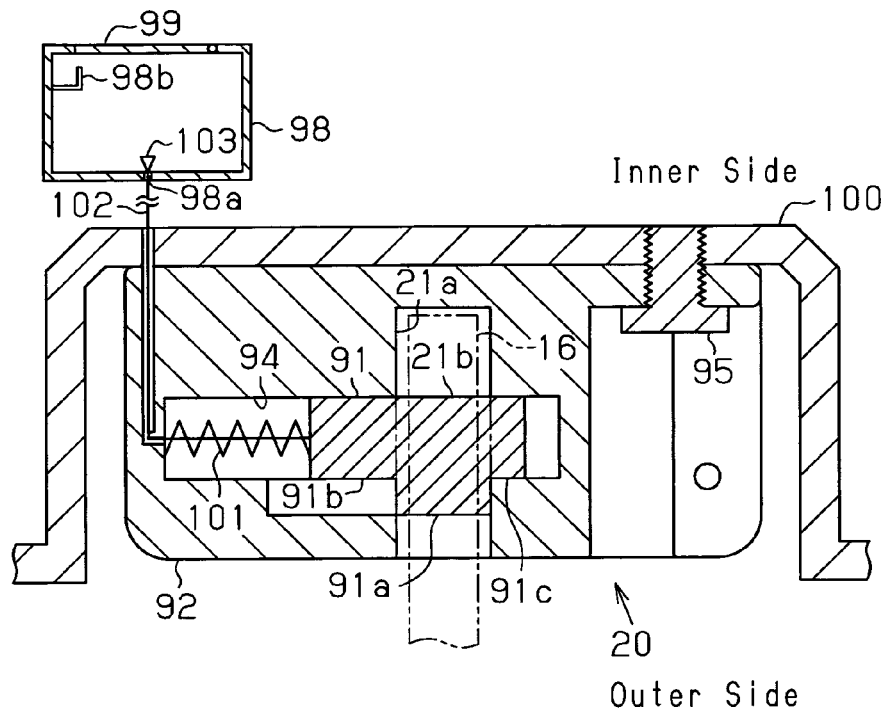
FIG. 26 is a cross-sectional view of a further manual unlocking mechanism arranged in the locking device of FIG. 20.
Figure 27:
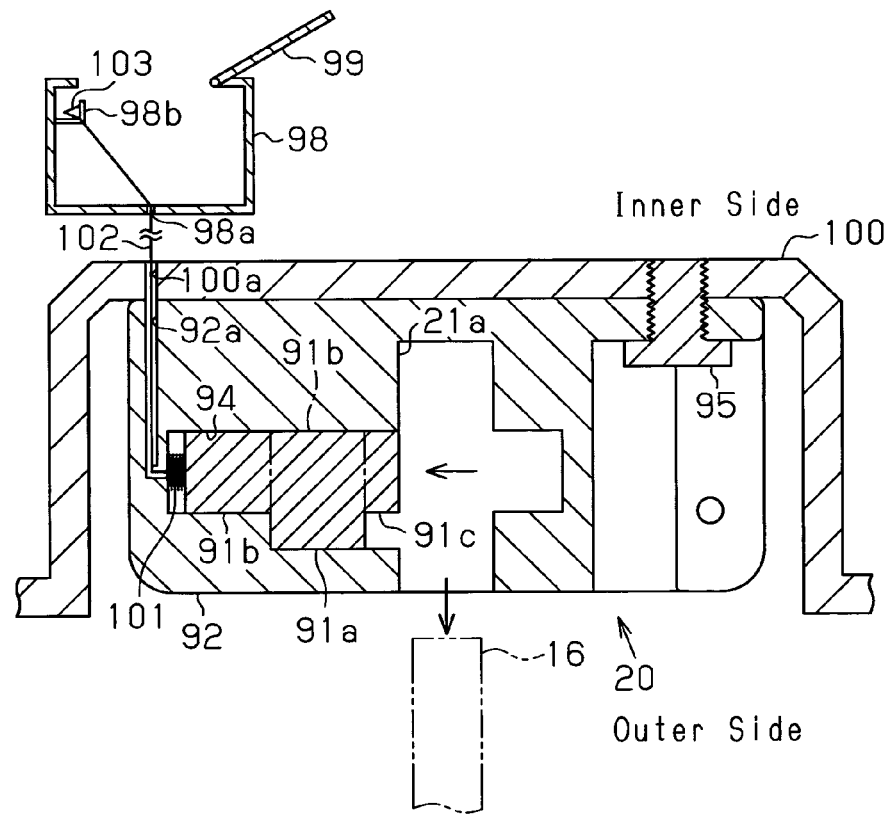
FIG. 27 is a cross-sectional view of the manual unlocking mechanism shown in FIG. 26 and illustrates a manually unlocked state.

Referring to FIGS. 26 and 27, in lieu of the urging spring 93 of the third embodiment, the locking device 90 of the embodiment uses an urging spring 101 that urges the engagement member 91 toward the engagement position (i.e., lock position, toward the right in FIG. 26). The urging spring 101 has one end fixed to a left end of the left extension 91b of the engagement member 91 and another end fixed to the wall of the movement passage 94 facing toward the left end of the left extension 91b. The urging spring 101 normally holds the engagement member 91 at the engagement position.

In the same manner as the first embodiment, the manual unlocking mechanism of the fourth embodiment includes a wire 102, which serves as an operation member. The wire 102 has an inner end fixed to the left end of the left extension 91b of the engagement member 91. The operation box 98, which is used by the user to manually cancel a locked state, is coupled to the vehicle body 100. The operation box 98 is arranged in the vehicle and arranged facing toward the locking device 90 (inlet 20). The main body case 92 includes a guide bore 92a, which guides the wire 102 to the operation box 98. The vehicle body 100 includes an insertion hole 100a, through which the wire 102 is inserted. The operation box 98 also includes an insertion hole 98a, through which the wire 102 is inserted. The wire 102 has an outer end drawn into the operation box 98 through the guide bore 92a of the main body case 92, the insertion hole 100a of the vehicle body 100, and the insertion hole 98a of the operation box 98. A handle 103 is fixed to the outer end of the wire 102. The handle 103 is hooked to an L-shaped mount 98b, which is arranged in the operation box 98, to keep the wire 102 in a drawn out state. The handle 103 and the mount 98b form an unlock holding member.

When the wire 102 is pulled out of the locking device 90, the engagement member 91 moves to the non-engagement position. This compresses the urging spring 101, which is arranged between the engagement member 91 and the movement passage 94. When the wire 102 is released, the urging force of the compressed urging spring 101 moves the engagement member 91 to the engagement position. The insertion holes 98a and 100a, which are arranged in accordance with the positional relationship of the locking device 90 and the operation box 98 determine the path along which the wire 102 moves. In this manner, the insertion holes 98a and 100a function as a guide. That is, the direction in which the wire 102 moves may be varied by the insertion holes 98a and 100a.

The operation of the manual unlocking mechanism 97 will now be discussed with reference to FIGS. 26 and 27.

When the power feeding plug 10 is in the locked state, as shown in FIG. 26, and an abnormality occurs such that movement of the hook 16 to the open position is hindered, the user uses the manual unlocking mechanism 97 to manually unlock the locking device 90. In this case, the user has the electronic key 80 verified to unlock a door and then enters the vehicle. In the vehicle, the user opens the lid 99 of the operation box 98. Then, the user grips the handle 103, pulls the wire 102, and hooks the handle 103 to the mount 98b.

In the same manner as the third embodiment, the locking device 90 of the fourth embodiment includes the engagement member 91, which has the projection 21b and is movable between the engagement position and the non-engagement position. Further, the wire 102, which allows for the engagement member 91 to be manually moved, is fixed to the left extension 91b of the engagement member 91. Thus, when an abnormality occurs in the locking device 90, the user draws out the wire 102 of the manual unlocking mechanism 97 to manually unlock the power feeding plug 10.

Referring to FIG. 27, when the wire 102 is pulled, the engagement member 91 is moved from the engagement position to the non-engagement position against the urging force of the urging spring 101. Since the projection 21b, which engages the hook 16, is moved out of the cavity 21a, the hook 16 can be removed from the cavity 21a. Thus, even when an abnormality occurs, for example, in the hook 16 when the power feeding plug 10 is in the locked state, the locked state may be manually canceled so that the power feeding plug 10 can be disconnected from the inlet 20. As long as key verification is completed in the vehicle, the start switch may be pushed to activate the hybrid system 3 and start the engine. This allows for the vehicle to be driven to a car dealer or the like so that the locking device 90 can be repaired.

In addition to advantage (9) of the third embodiment, the manual unlocking mechanism 97 of the fourth embodiment in the locking device 90 has the advantages described below.

(11) The locking device 90 is formed so that he engagement member 91, which includes the projection 21b, is movable between the engagement position and the non-engagement position. Further, the urging spring 101 urges the engagement member 91 to the engagement position. Thus, even when an abnormality occurs in the locking device 90 thereby hindering movement of the hook 16, the user may pull the wire 102 to move the engagement member 91 to the non-engagement position. This allows for the hook 16 to be removed from the cavity 21a.

(12) The mount 98b, which is used to hook the handle 103 of the wire 102, is arranged in the operation box 98 (or on a wall), which is installed in the vehicle. Thus, by hooking the handle 103 of the wire 102 to the mount 98b, the wire 102 is kept in a drawn out state. This maintains the unlocked state even when the wire 102 is released and improves convenience.

(13) The operation member is the wire 102. Thus, the wire 102 may be easily drawn out and returned to its original position using the insertion holes 98a and 100a and the like as a guide. This increases the layout freedom and facilitates the arrangement of the wire 102.

It should be apparent to those skilled in the art that the present invention may be embodied in many other specific forms without departing from the spirit or scope of the invention. Particularly, it should be understood that the present invention may be embodied in the following forms.

In the first and second embodiments, the transmission shaft 25 transmits the drive force of the motor 22 to the stopper 46. However, the transmission shaft 25 may be eliminated. In this case, the motor 22 directly drives the stopper 46.

In the first and second embodiments, the wire 51 is directly fixed to the lock bar 23 or 42. However, the wire may be coupled by another member to a lock bar.

Figure 16:
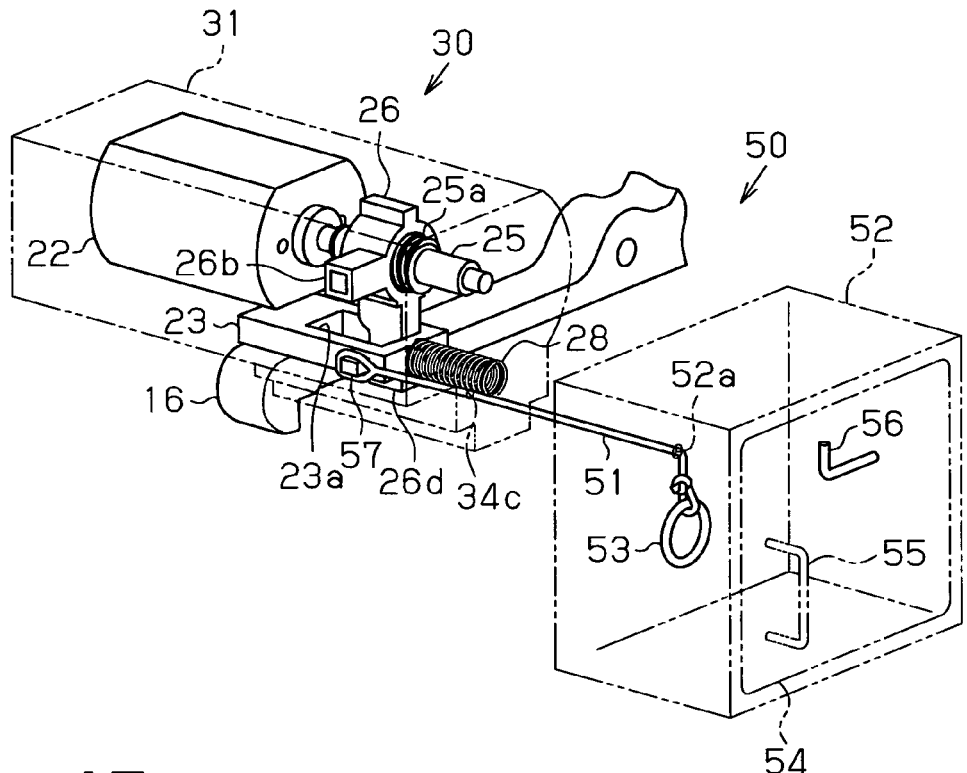
FIG. 16 is a perspective view of another manual unlocking mechanism arranged in the locking device of FIG. 4.
Figure 17:
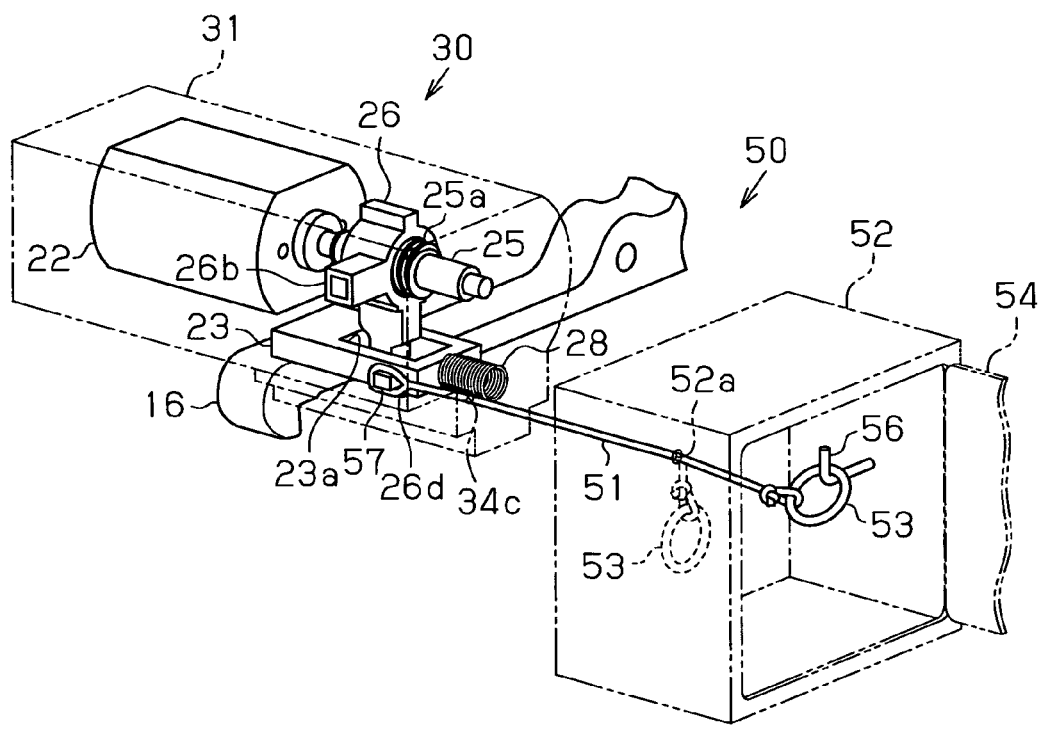
FIG. 17 is a perspective view of the manual unlocking mechanism shown in FIG. 16 in a manually unlocked state.

In the first embodiment, the wire 51 has one end fixed to the spring support 23c of the lock bar 23. However, as shown in FIGS. 16 and 17, the wire 51 may be coupled to a protrusion 57, which is arranged on a side wall of the lock bar 23. In this case, the wire 51 is drawn out of the main body case 31 without being inserted into the spring 28. This facilitates the coupling of the wire 51 to the lock bar 23 (protrusion 57) and the removal of the wire 51 from the lock bar 23 (protrusion 57). This facilitates maintenance of the manual unlocking mechanism 50.

Figure 18:
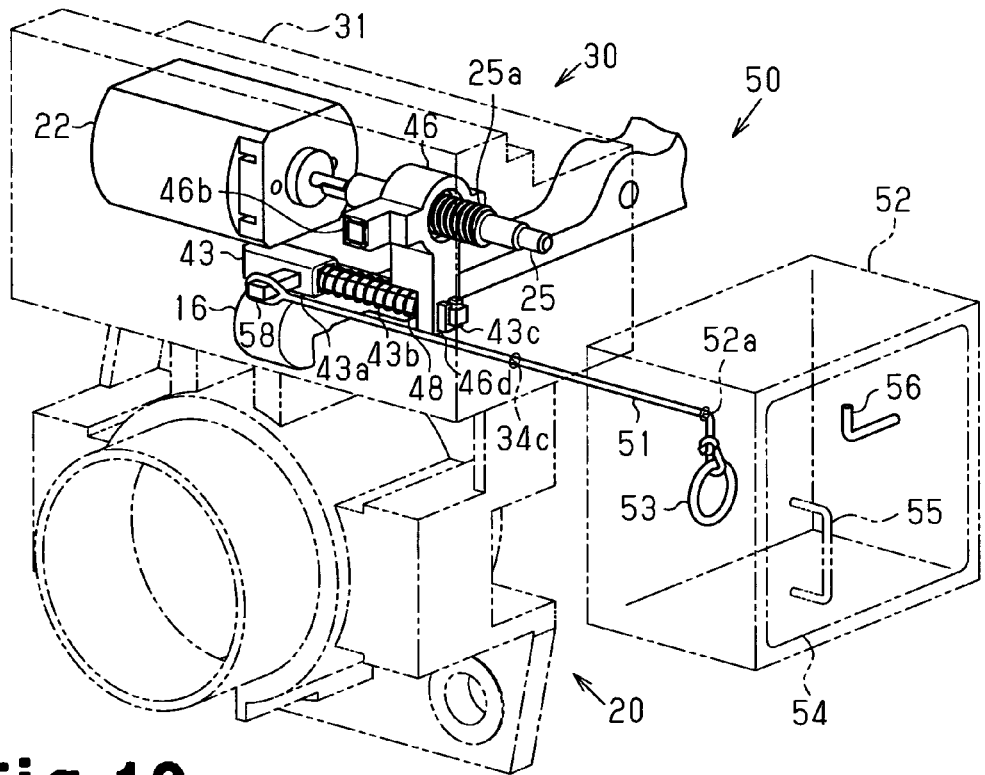
FIG. 18 is a perspective view of a further manual unlocking mechanism arranged in the locking device of FIG. 11.
Figure 19:
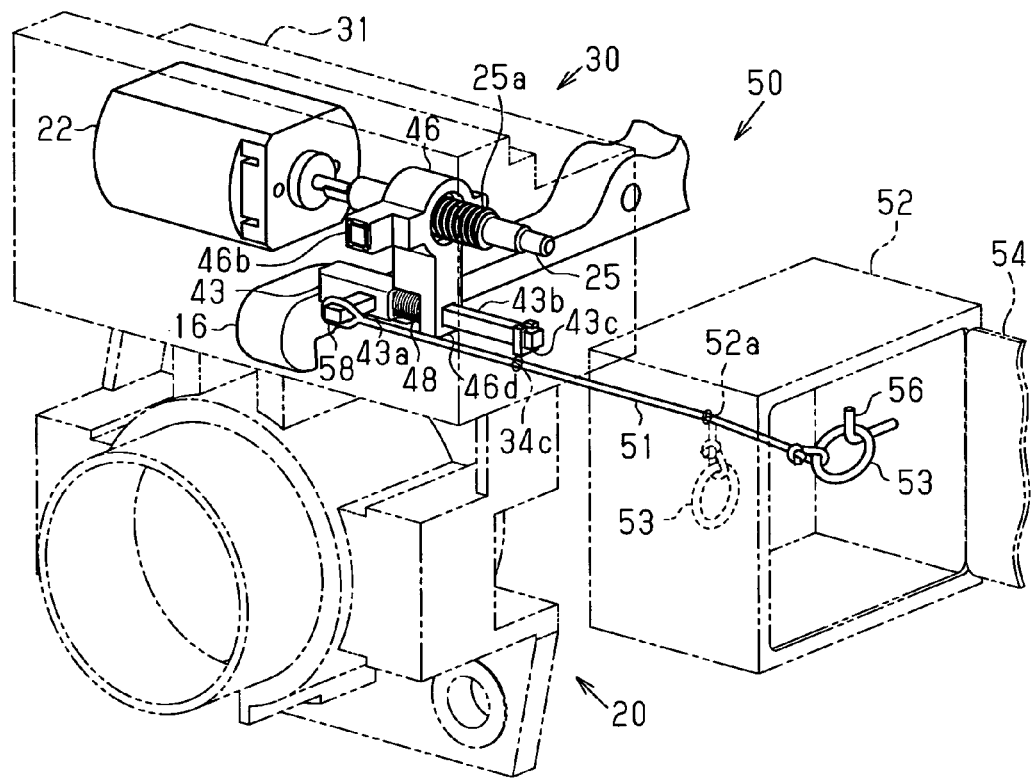
FIG. 19 is a perspective view of the manual unlocking mechanism shown in FIG. 18 in a manually unlocked state.

In the second embodiment, the wire 51 has one end fixed to the shaft portion 43b of the lock bar 43. However, as shown in FIGS. 18 and 19, the wire 51 may be coupled to a protrusion 58, which is arranged on a side wall of the lock bar 43. In this case, the wire 51 is easily coupled to the lock bar 43 (protrusion 58) and easily removed from the lock bar 43 (protrusion 58). This facilitates maintenance of the manual unlocking mechanism 50.

In the first, second, and fourth embodiments, the wires 51 and 102 are used as an operation member. However, for example, a rod-shaped member may be used in lieu of the wires 51 and 102.

In the third embodiment, the restriction bolt 96, which fastens the inlet 20 to the vehicle body 100, is used as the operation member. However, for example, a rod-shaped member may be used in lieu of the restriction bolt 96. That is, the means for holding the engagement member 91 at the engagement position is not limited to a bolt and may be substituted by another member.

In the first and second embodiments, the unlock holding member (the ring 53 and mount 56) is used to hold the wire 51 in a drawn out state. However, such an unlock holding member may be eliminated. This prevents the lock bars 23 and 43 from being left at the unlock position.

In the third embodiment, the urging spring 93 may be eliminated. That is, when performing manual unlocking, the user may directly apply force that moves the engagement member 91 to the non-engagement position.

In the third embodiment, the restriction bolt 96 contacts the end face of the engagement member 91 and holds the engagement member 91 at the engagement position. This holding structure may be changed. For example, the engagement member 91 may include a threaded bore (or non-threaded bore), and the restriction bolt 96 may be inserted into the bore to hold the engagement member 91 at the engagement position.

In the fourth embodiment, the unlock holding member (the handle 103 and the mount 98b) is used to hold the wire 102 in a drawn out state. However, such an unlock holding member may be eliminated. This prevents the engagement member 91 from being left at the non-engagement position (unlock position).

In the first and second embodiments, the manual unlocking mechanism 50 is applied to the locking device 30. However, in lieu of or in addition to the manual unlocking mechanism 50, the manual unlocking mechanism 97 of the third and fourth embodiments for the locking device 90 may be applied. In this case, when an abnormality occurs in the locking device 30, that is, when the lock bar 23 (or 43) cannot be moved to the lock position, the manual unlocking mechanism 97 may be used to move the engagement member 91 to the non-engagement position even if the locking device 30 does not include the manual unlocking mechanism 50. This allows for the hook 16 to be disengaged from the projection 21b so that the power feeding plug 10 can be disconnected.

In each of the above-discussed embodiments, the operation boxes 52 and 98, which are used by the user to operate the manual unlocking mechanisms 50 and 97, are arranged in the vehicle but may be arranged outside the vehicle as long as operation by an unauthorized person is prevented. This would allow for the user to perform manual unlocking without having to enter the vehicle.

In each of the above-discussed embodiments, the inlet 20 is arranged in the front right surface of the vehicle 1 but may be arranged at other positions, such as a rear side surface or front surface of the vehicle. When the inlet 20 is arranged in the front surface of the vehicle, the manual unlocking mechanism 50 or 97 may be arranged in the engine compartment.

In each of the above-discussed embodiments, the hook 16 is arranged above the coupler 14 of the power feeding plug 10. Instead of the hook 16 being arranged on one side of the coupler 14, upper and lower hooks may be arranged on opposite sides of the coupler 14.

In each of the above-discussed embodiments, the lock bar 23 is linearly moved in the axial direction of the motor 22. Instead, for example, the lock bar 23 may be rotated in the direction of the rotation produced by the motor 22.

In the first embodiment, instead of the buffer opening 23a, which extends through the lock bar 23, a recess such as a groove may be formed in the lock bar 23.

In the first and second embodiments, the motor 22 is used as a drive unit. However, a different mechanism may be used as the drive unit in lieu of the motor 22. For example, a mechanism that linearly moves the lock bar 23 with a link when the user operates an operation member such as a lever may be used.

In each of the above-discussed embodiments, the locking device 30 is driven when ID verification is successful and the hook 16 engages the projection 21b. However, the locking device 30 may be driven under the sole condition that the hook 16 is engaged with the projection 21b. In this manner, various conditions may be employed to determine automatic connection of the power feeding plug 10 to the inlet 20.

In each of the above-discussed embodiments, the condition for starting unlocking with the locking device 30 is not necessarily limited to the disconnection switch 76 being operated when ID verification is satisfied. For example, when the battery 4 is fully charged, the power feeding plug 10 may be automatically disconnected.

In each of the above-discussed embodiments, the electronic key 80 undergoes ID verification. Instead, mechanical verification may be performed with a mechanical key.

In each of the above-discussed embodiments, the electronic key system 70 may be, for example, an immobilizer system that uses a transponder as a transmission origin of an ID code.

In each of the above-discussed embodiments, the radio wave frequency used by the electronic key system 70 is not limited to LF and UHF and other frequencies may be used. Further, the frequency of the radio wave transmitted from the vehicle 1 to the electronic key 80 and the frequency of the radio wave transmitted from the electronic key 80 to the vehicle 1 do not necessarily have to be different and may be the same.

In each of the above-discussed embodiments, user authentication is not necessarily limited to key authentication performed with the electronic key 80 and may be another type of authentication, such as biometric authentication.

In each of the above-discussed embodiments, the locking device and its manual unlocking structure is applied to the inlet 20 of the plug-in hybrid vehicle 1 but may also be applied to the inlet of an electric vehicle.

In each of the above-discussed embodiments, the locking device 30 or 90 is not limited to just the vehicle 1 and may also be applied to any apparatus or machine that includes a rechargeable battery.

The present examples and embodiments are to be considered as illustrative and not restrictive, and the invention is not to be limited to the details given herein, but may be modified within the scope and equivalence of the appended claims.

The invention claimed is:

1. A locking device comprising:
a restriction member that restricts movement of a hook of a power feeding plug, wherein the power feeding plug is adapted to be connected to a power receiving connector;
a stopper that supports the restriction member so that the restriction member is movable relative to the stopper;
a drive unit that is electrically driven to move the stopper, wherein the movement of the stopper allows for movement of the restriction member between a lock position, in which the restriction member is positioned adjacent to the hook and restricts movement of the hook, and an unlock position, in which the restriction member is separated from the hook and permits movement of the hook;
an urging member that pushes the restriction member in a direction from the unlock position toward the lock position to move the restriction member when the stopper moves;
an operation member that is connected to the restriction member to manually move the restriction member, wherein the restriction member moves relative to the stopper against an urging force produced by the urging member when the operation member moves the restriction member from the lock position to the unlock position; and
an operation box arranged in a vehicle and used to manually operate the operation member in the vehicle.

2. The locking device according to claim 1, wherein:
the operation member includes a wire coupled to the restriction member, and
the locking device further comprises a guide that defines a path along which the wire moves and guides the movement of the wire.

3. The locking device according to claim 1, further comprising:
an unlock holding member that holds the operation member in a state in which the restriction member is separated from the hook.

4. The locking device according to claim 1, wherein:
the restriction member is plate-shaped and includes a recess;
the stopper is fitted into the recess of the restriction member so as to be movable in a reciprocating manner in the recess;
the locking device further comprises a case serving as a shell; and
the urging member is arranged between the restriction member and the case to urge the restriction member toward the lock position.

5. The locking device according to claim 1, wherein:
the operation member is coupled to the restriction member along a path in which the restriction member moves.

6. The locking device according to claim 1,
further comprising a transmission member that transmits drive force from the drive unit to the stopper to move the stopper.

* * * * *